United States Patent [19]

Manasson et al.

[11] Patent Number: 5,796,881
[45] Date of Patent: Aug. 18, 1998

[54] LIGHTWEIGHT ANTENNA AND METHOD FOR THE UTILIZATION THEREOF

[75] Inventors: Vladimir A. Manasson, Los Angeles; Lev S. Sadovnik, Irvine, both of Calif.

[73] Assignee: WaveBand Corporation, Torrance, Calif.

[21] Appl. No.: 732,062

[22] Filed: Oct. 16, 1996

[51] Int. Cl.⁶ .................................................. G02B 6/10
[52] U.S. Cl. ............................ 385/9; 385/14; 385/2; 385/3
[58] Field of Search .................. 343/700 MS; 257/44, 257/45; 385/14, 15, 2, 3, 8, 9

[56] References Cited

U.S. PATENT DOCUMENTS

| | | | |
|---|---|---|---|
| 3,904,270 | 9/1975 | Cheo | 350/96 WG |
| 4,744,616 | 5/1988 | Robinson et al. | 350/96.14 |
| 5,530,777 | 6/1996 | Enokihara et al. | 385/2 |

*Primary Examiner*—John Ngo
*Attorney, Agent, or Firm*—Nilles & Nilles, S.C.

[57] ABSTRACT

Systems and methods for optical control of radar antenna beam steering are described. An apparatus includes: a feeder waveguide; and a waveguide array electromagnetically coupled to said feeder waveguide, said waveguide array including: a plurality arms, each of said plurality of arms including: a plasma induced modulator having a transmission coefficient that is ≦1, said plasma induced modulator including: a rib waveguide electromagnetically coupled to said feeder waveguide. The systems and methods provide advantages in that optical beam steering is achieved with a lightweight inexpensive apparatus.

30 Claims, 25 Drawing Sheets

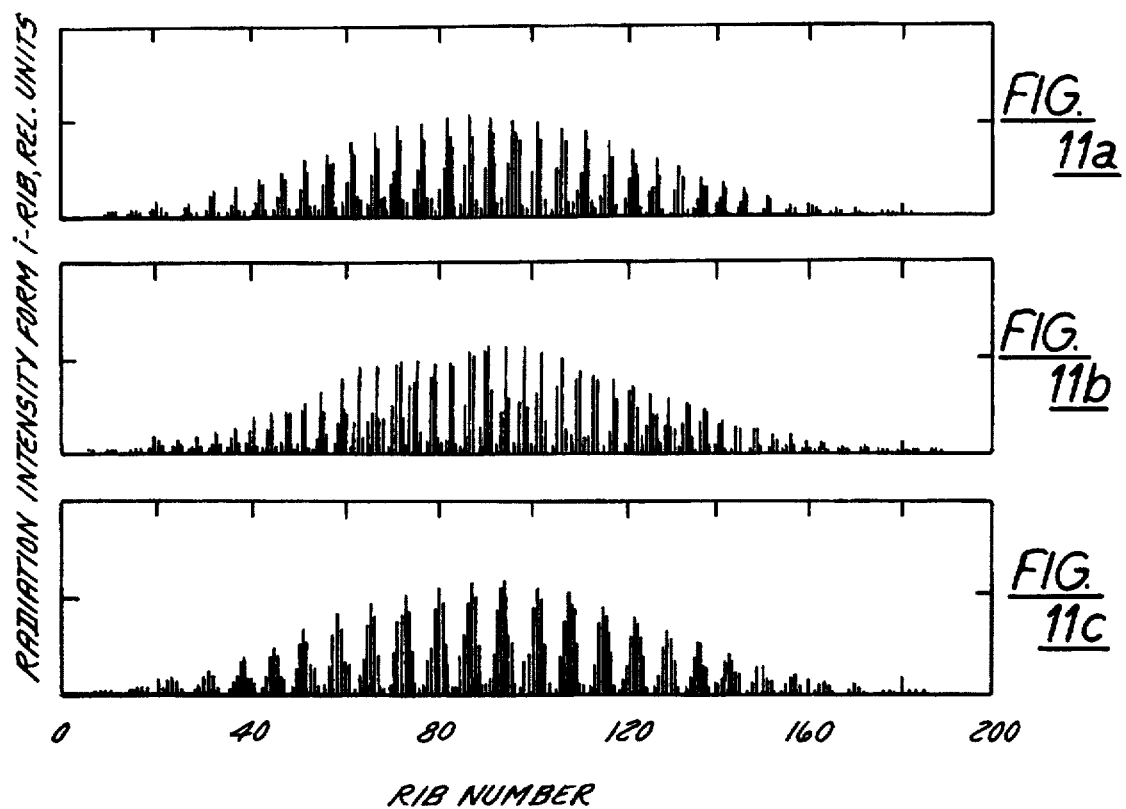
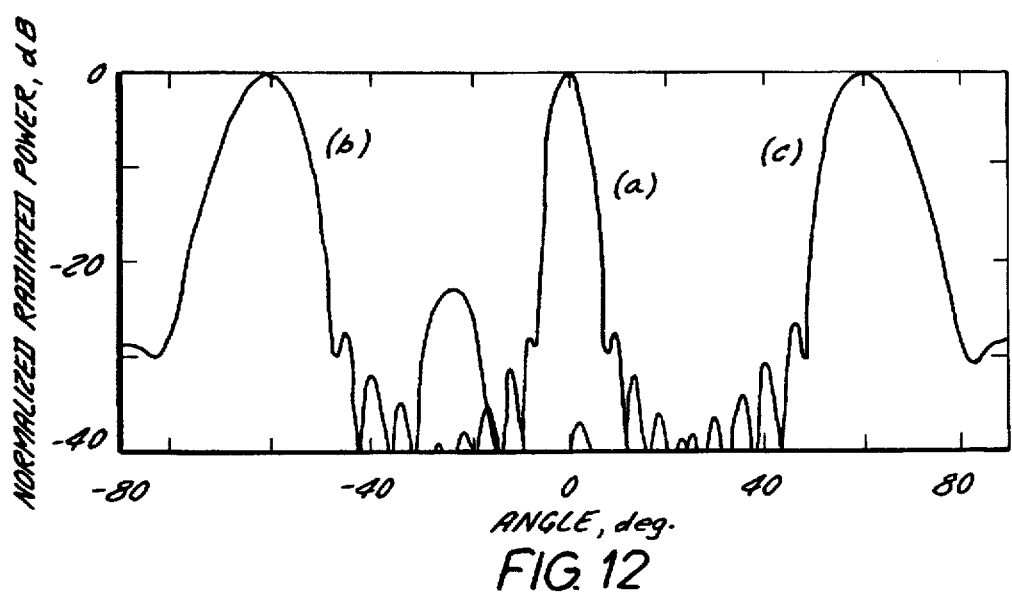

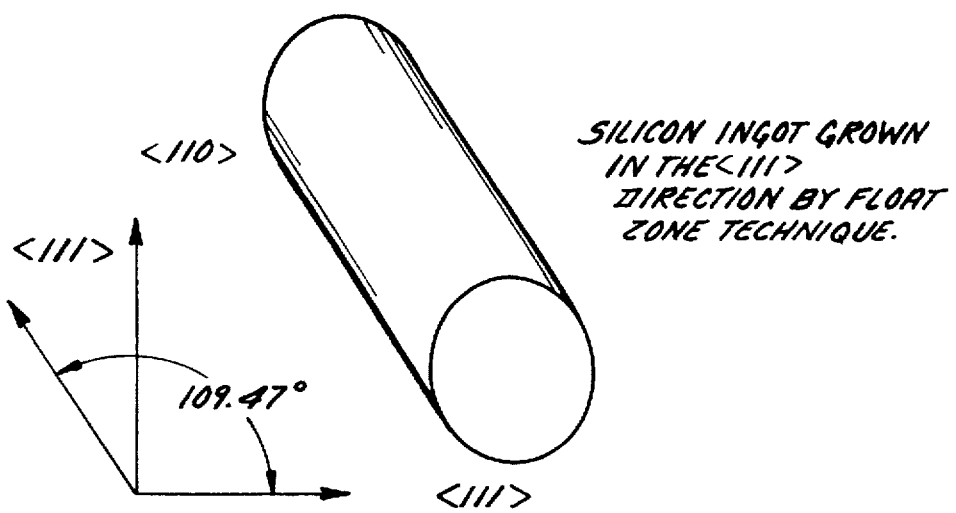
FIG. 15A — SILICON INGOT GROWN IN THE <111> DIRECTION BY FLOAT ZONE TECHNIQUE.
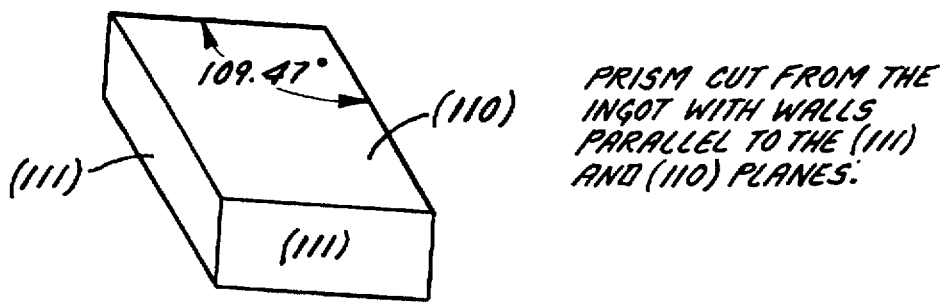
FIG. 15B — PRISM CUT FROM THE INGOT WITH WALLS PARALLEL TO THE (111) AND (110) PLANES.
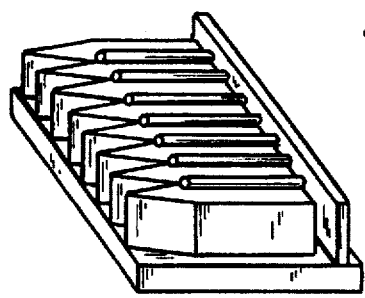
FIG. 15C — ORIENTATION-DEPENDANT DEEP ETCHING
ETCH: 50% KOH
50% WATER
TEMPERATURE: 80°C

LIGHTWEIGHT ANTENNA AND METHOD FOR THE UTILIZATION THEREOF

BACKGROUND OF THE INVENTION

1. Field of the Invention

The present invention relates generally to the field of antennas. More particularly, the present invention relates to a lightweight radar antenna in which optical control is used for beam steering. Specifically, a preferred embodiment of the present invention relates to a lightweight millimeter wavelength (MMW) antenna wherein beam steering control is provided via optical fiber and no photo-detectors, or other active elements, are present on the array. The present invention thus relates to an antenna of the type that can be termed optically steered.

2. Discussion of the Related Art

Within this application several publications are referenced by arabic numerals within parentheses. Full citations for these, and other, publications may be found at the end of the specification immediately preceding the claims. The disclosures of all these publications in their entireties are hereby expressly incorporated by reference into the present application for the purposes of indicating the background of the present invention and illustrating the state of the art.

Historically, reducing the weight of radar antennas has been a long sought after goal. One unsatisfactory previously recognized approach to lowering antenna weight, and cost, was to utilize a flat surface micro-strip antenna that functions as a parabolic reflector. However, this type of antenna still requires mechanical rotation, and all of the heavy attendant structural supports, and drives, to permit such rotation.[1]

Electronically steered antennas represent a strategic improvement in antenna weight reduction because they do not require mechanical rotation. Moreover, electronically steered antennas provide the additional advantages of high steering rate, lower cost, compactness, and high flexibility in beam forming.

The most promising candidate for implementing electronically steered antennas has been the phased array approach. The phased array concept has been evolving for decades and dozens of phased array architectures have been invented.[2] Despite these intense efforts, various problems hamper the technological benefits of the electronically steered phased array approach. For example, the metal waveguide feeders are bulky, heavy and expensive. Further, the control of active elements (i.e., phase shifters and amplitude modulators), is very complicated and power consuming.[3]

The need for individual independent control of the radiating elements is the main bottleneck of the traditional phased array approach. The number of radiating elements in a phased array may easily reach 10,000. Each of these radiating elements requires its own processing circuit including phase shifters and amplitude modulators placed in a metal waveguide. An unsatisfactory previously recognized approach to lowering the weight of phased array antennas has been to replace the electrical distribution of control signals with distribution by optical fiber. However, this approach is only marginally effective with regard to weight reduction and does not reduce the system complexity.

Another unsatisfactory previously recognized approach to lowering the weight of phased array antennas, has been to use photonic devices to implement the true time delay required for beam steering and optical carriers to conduct the microwave signal transmission. Although this approach significantly reduces the weight of the microwave lines, complexity is added to the antenna's transmit/receive (T/R) modules. In addition, this approach requires high speed optical modulators, transmitters and receivers. Further, separate power supply wiring is still required for each antenna array element. What is needed therefore is a lightweight phased array antenna with a minimal number of electrically powered elements and preferably no metal parts.

Historically, it has been known that MMW propagation in a semiconductor waveguide is attenuated when the semiconductor waveguide is illuminated by light. The main reason behind the drastic changes in MMW attenuation between -on- and -off- light illumination conditions is the generation of a photo-injected electron hole plasma within the semiconductor. The photo-injected electron-hole plasma effectively interacts with microwave energy through changes in the dielectric constant $\epsilon$ of the semiconductor material.

Another unsatisfactory previously recognized approach to lowering the weight of phased array antennas, has been to utilize the change in the real $Re(\epsilon)$ part of the dielectric constant $\epsilon$ of a silicon semiconductor material with a photo-injected electron hole plasma. It should be noted that in this previous approach, the imaginary $Im(\epsilon)$ part of the dielectric constant $\epsilon$ is parasitic and imposes undesirable losses. To illustrate the problems encountered by this previous approach, consider the phase shift and the losses introduced by a nonequilibrium electron-hole plasma. Referring to FIG. 1, appropriately labeled "PRIOR ART," the phase shift (top trace) and loss (bottom trace) imposed by a nonequilibrium electron-hole plasma in a semiconductive silicon waveguide is illustrated. A noticeable phase shift occurs only when the plasma density P is greater than $3(10)^{18}$ cm$^{-3}$. At this level of photo-injection, the losses reach a maximum where the microwave propagation is practically stopped. At higher pumping levels, the electron-hole plasma degenerates and behaves as in a metal. At those higher levels (e.g., $P \geq 10^{20}$ cm$^{-3}$), the plasma exhibits low losses and induces the highest phase shift. The main problem with this approach is that an unacceptably high pumping energy is required to achieve such high densities. For example, to reach $P=10^{20}$ cm$^{-3}$ the silicon needs to be illuminated with a pulse of energy of as high as approximately 20 J cm$^{-2}$. Such high pumping energies require powerful, and heavy, illumination sources that generate a large amount of heat.[4] This fact constitutes the major obstacle to practical implementation of the known photosensitive phase shifters.

The below-referenced U.S. Patents disclose embodiments that were at least in-part satisfactory for the purposes for which they were intended. The disclosures of both the below-referenced prior U.S. Patents, in their entireties are hereby expressly incorporated by reference into the present application for purposes including, but not limited to, indicating the background of the present invention and illustrating the state of the art.

U.S. Pat. No. 4,739,334 discloses an electro-optical beam forming network for phased array antennas. U.S. Pat. No. 5,140,651 discloses semiconductive guided-wave programmable optical delay lines using electro-optic Fabry-Perot elements.

SUMMARY AND OBJECTS OF THE INVENTION

By way of summary, the present invention is directed to integration of the radiating elements of a phased array on a single substrate with collective optical control through optical fibers. An unexpected beneficial effect of the present invention, which is a substantial improvement, is to obtain free space recombination from a lightweight antenna that has no active elements on the array.

A primary object of the invention is to provide an optically controlled beam steering apparatus that is lightweight. Another object of the invention is to provide an apparatus that is cost effective. It is another object of the invention to provide an apparatus that is rugged and reliable, thereby decreasing down time and operating costs. It is yet another object of the invention to provide an apparatus that has one or more of the characteristics discussed above but which is relatively simple to manufacture and assemble using a minimum of equipment.

In accordance with a first aspect of the invention, these objects are achieved by providing an apparatus comprising: a base; a feeder waveguide connected to said base; and a waveguide array (i) connected to said base, and (ii) electromagnetically coupled to said feeder waveguide, said waveguide array including: a plurality of arms, each of said plurality of arms including: a plasma induced modulator having a transmission coefficient that is <1, said plasma induced modulator including: a rib waveguide electromagnetically coupled to said feeder waveguide, said rib waveguide including a first dielectric waveguide; a photosensitive semiconductive plasma injector connected to said first dielectric waveguide, said photosensitive semiconductive plasma injector including a proximal tapered end and a distal tapered end; an optical fiber connected to said photosensitive semiconductive plasma injector with a connector that includes a layer of indium tin oxide; and an infrared light emitting diode connected to said optical fiber with a nonimaging coupler, wherein each of said plurality of arms has a phase shift of approximately $\Delta\phi=2\pi dn_{\it eff}/\lambda$ relative to every other of said plurality of arms, where d is a distance between each of said plurality of arms, $n_{\it eff}=\beta/K_o$ is an effective index of refraction in said feeder waveguide, $\beta$ is a propagation constant in said feeder waveguide, $K_o=2\pi/\lambda$ is a free space wavenumber and $\lambda$ is the wavelength of an electromagnetic signal and wherein a coupling coefficient $K_P$ between each of said plurality of arms and said feeder waveguide varies according to a relationship $K_P=0.3(P/B)^2$, where P is a rank number of an individual arm and B is a total number of said plurality of arms. In another embodiment, these objects are achieved by providing an apparatus, comprising: a semiconductor plate including a first opposing side and a second opposing side; a metal layer connected to said first opposing side; a main feeder strip connected to said second opposing side; and a plurality of metal strips (i) connected to said second opposing side, and (ii) electromagnetically coupled to said main feeder strip, said plurality of metal strips defining a plurality of arms within said semiconductor plate.

Another object of the invention is to provide a method that can be used to make the apparatus. It is another object of the invention to provide a method that is predictable and reproducible, thereby decreasing the variance among the resulting apparatus and operating costs thereof. It is yet another object of the invention to provide a method that has one or more of the characteristics discussed above but which is relatively simple to setup and operate using moderately skilled workers.

In accordance with a second aspect of the invention, these objects are achieved by providing a method comprising: providing a prism; and etching said prism so as to form said feeder waveguide and said rib waveguide. In another embodiment, these objects are achieved by providing a method comprising: providing a semiconductor plate; depositing a metal layer on said first opposing side of said semiconductor plate; depositing a device layer on a second opposing side of said semiconductor plate; and etching said device layer so as to form said main feeder strip and said plurality of metal strips.

Another object of the invention is to provide a method that can be used to operate the apparatus. It is another object of the invention to provide a method that is predictable and reproducible, thereby decreasing the variance of the beam. It is yet another object of the invention to provide a method that has one or more of the characteristics discussed above but which is relatively simple to implement and operate.

In accordance with a third aspect of the invention, these objects are achieved by providing a method comprising providing a plurality of arms wherein each of said plurality of arms has a phase shift of approximately $\Delta\phi=2\pi dn_{\it eff}/\lambda$ relative to every other of said plurality of arms, where d is a distance between each of said plurality of arms, $n_{\it eff}=\beta/K_o$ is an effective index of refraction in said feeder waveguide, $\beta$ is a propagation constant in said feeder waveguide, $K_o=2\pi/\lambda$ is a free space wavenumber and $\lambda$ is the wavelength of an electromagnetic signal; and illuminating each of said plurality of arms with a flux $I_P$ according to a relationship $I_P(1-\sin((2\pi dP)/\Lambda))/2$ where d is a spacing between said plurality of arms, P is a rank number of each of said plurality of arms and $\Lambda$ is a grating parameter. In a preferred embodiment, $\Lambda=\lambda(n_{\it eff}-\sin(\alpha))$ where $n_{\it eff}$ is an effective refractive index of said electromagnetic signal in said feeder waveguide and $\alpha$ is a beam steering angle.

These, and other, aspects and objects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore nonlimiting, embodiments illustrated in the drawings accompanying and forming a part of this specification, wherein like reference numerals designate the same elements in the several views, and in which:

FIGS. 11A–C illustrate radiation intensity as a function of rib number for a plurality of arms according to the present invention;

FIGS. 12 illustrates beam patterns for the radiation intensity functions illustrated in FIGS. 11A–C;

FIGS. 15A–C illustrates one method of fabrication of an integrated panel according to the first embodiment of the present invention;

DESCRIPTION OF PREFERRED EMBODIMENTS

The present invention and the various features and advantageous details thereof are explained more fully with reference to the nonlimiting embodiments that are illustrated in the accompanying drawings and detailed in the following description. Descriptions of well known components and processing techniques are omitted so as to not unnecessarily obscure the present invention in detail.

1. System Overview

The present invention belongs to a class of new, emerging antennas generally referred to as optically controlled antennas. Practical interest in this type of antenna has arisen with the development of fiber optic light delivery systems and semiconductor sources of electromagnetic radiation. Semiconductor laser diodes (LDs) and light emitting diodes (LEDs) constitute near ideal pumping sources to generate electron-hole plasma within photosensitive media, such as semiconductors.

In contrast to the known approach, the present invention is based on the attenuation imposed by photo-injected plasma on the imaginary Im(ε) part of a dielectric constant. Compared to the known approach, the required pumping power for the present invention is at least 1000 times lower.

The above-mentioned requirements of nonmechanical steering, lightweight and economy are mutually contradicting and cannot be satisfied simultaneously in the case of traditional antennas. However, it is rendered possible to simultaneously satisfy these requirements to a certain extent by employing an antenna design according to the present invention in consideration of the fact that the present invention utilizes a change in the Im(ε) part of a dielectric constant to provide attenuation of phase shifted components together with free space recombination of the attenuated phase shifted components.

Figure 1:
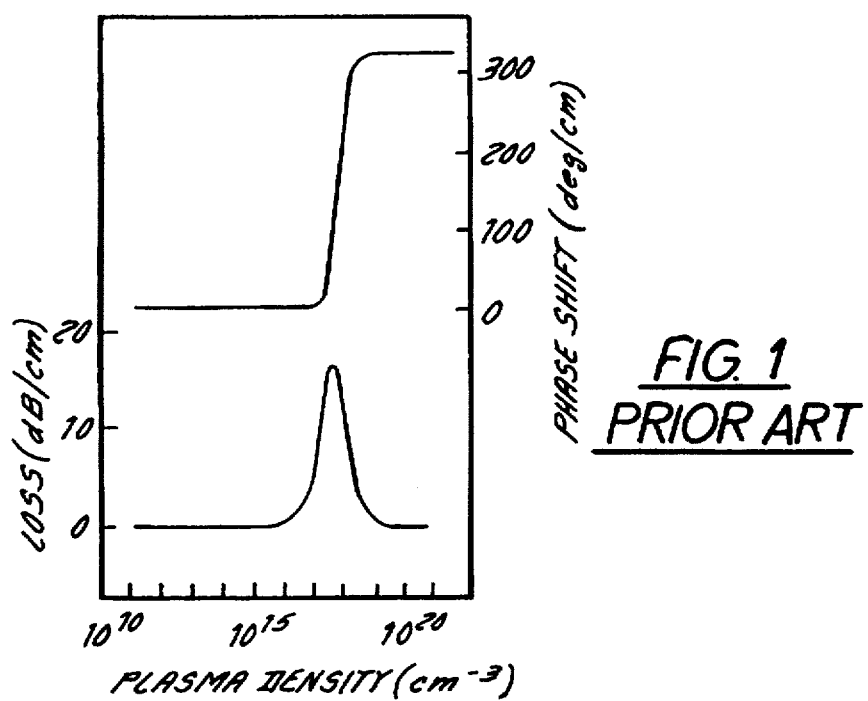
FIG. 1 illustrates loss and phase shift as a function of plasma density in a conventional photocontrolled phase shifter, appropriately labeled "PRIOR ART"
Figure 2:
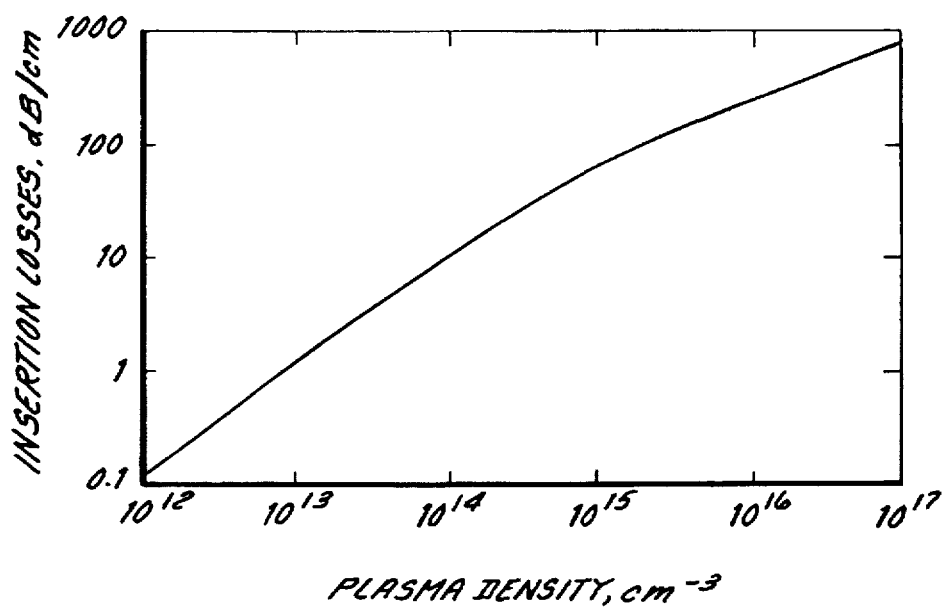
FIG. 2 illustrates insertion loss as a function of plasma density according to the present invention.

Referring now to FIG. 2, X-band attenuation in a dielectric waveguide caused by plasma absorption in an adjacent silicon layer is shown. It will be appreciated that the insertion losses are a function of the plasma density and that this light controlled attenuation has a large (e.g., up to 40 dB), dynamic range.

The present invention is well suited to X-band operation at 2 kW peak power with ±10° elevation and ±60° horizontal scanning. Driven by a simple microprocessor, such as, for example, a personal computer (PC), a system controller according to the present invention can provide 256 levels of light intensity corresponding to 256 levels of attenuation.

The amount of light energy needed to generate a certain level of microwave attenuation in a nonphotosensitive waveguide is determined by the electron-hole plasma density required to obtain corresponding changes in the dielectric constant of the adjacent photosensitive layer. Functionally, an electromagnetic signal is split into a plurality of components that are phase separated from one another due to different path lengths through the feeder waveguide. Typically, the electromagnetic signal is divided into a number of signals, of approximately equal strength, that are phase separated from one another by a phase shift of approximately $\Delta\phi=2\pi dn_{\mathit{eff}}/\lambda$, where d is a distance between each of said plurality of arms, $n_{\mathit{eff}}=\beta/K_o$ is an effective index of refraction in said feeder waveguide, β is a propagation constant in said feeder waveguide, $K_o=2\pi/\lambda$ is a free space wavenumber and β is the wavelength of the electromagnetic signal. These components then undergo individual amplitude modulation based on the attenuation caused by individually controlled electron-hole plasma densities in layers of photosensitive material that are adjacent each of the waveguides. These attenuated components are then recombined. Thus, a controlled phase shift of the original signal is realized merely through amplification modulation of the individual phase shifted components in view of the fact that the different path length components are recombined. (This recombination can be represented by vector addition of the phase shifted individually attenuated components.) Most importantly, far-field recombination of the amplitude modulated components obviates the need for any component recombination structure, thereby yielding a tremendous weight savings.

2. Detailed Description of Preferred Embodiments

Referring to the drawings, it can be seen that the present invention uses direct amplitude modulation of microwaves. This direct modulation is controlled by light. The far-field recombination of phase-shifted components results in a lightweight, inexpensive, optically steerable antenna. This totally new principle of operation is applicable to most radar systems (e.g., from X-band to W-band).

This radically new approach has a number of advantages. First, the present invention does not use conventional phase shifters, which are typically the most expensive and lossy elements in a conventional phased array. This drastically lowers the cost of the antenna. Second, the integrated design results in compactness and much lower cost of fabrication. Third, the absence of metal waveguides and compactness significantly reduces the weight of the antenna. Fourth, the fiber-optic distribution system allows for remote antenna control. Fifth, the high thermal conductivity of the photosensitive and nonphotosensitive materials permits distributed heat absorption, and the high specific surface area of the rib structure of the integrated panel permits thermal radiation on a large scale and significantly increases the power limit of the present invention in comparison with conventional phased array antennas where active elements with relatively tiny surface areas must dissipate comparable amounts of power.

The present invention is based on a phase-shifter structure that is totally different from any previously suggested structure, or method. The present invention will be described by first explaining the principal of amplitude modulated phase shifting by introducing a three-arm interferometer. The description will then turn to a consideration of two separate embodiments of integrated panels that are based on far-field recombination of amplitude modulated components, followed by a detailed consideration of steering control. Pursuant to the present invention, the features illustrated in the drawings are not necessarily drawn to scale.

A. Three-Arm Interferometer

Figure 3:
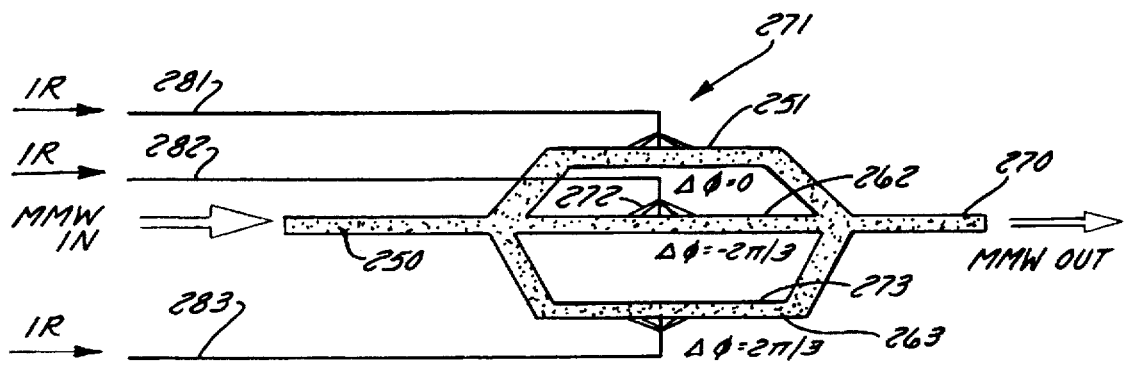
FIG. 3 illustrates a schematic top plan view of a three-arm interferometer according to the present invention.

Referring now to FIG. 3, a three-arm interferometer is shown. Input waveguide 250 is connected to a first arm 261, a second arm 262 and a third arm 263. Each of these three arms is in turn connected to output waveguide 270. First arm 261 includes a first plasma induced modulator 271.

Similarly, second arm 262 includes a second plasma induced modulator 272. Likewise, third arm 263 includes a third plasma induced modulator 273. A first optical fiber 281 is connected to the first plasma induced modulator 271. A second optical fiber 282 is connected to the second plasma induced modulator 272. A third optical fiber 283 is connected to the third plasma induced modulator 273. Significantly, the phase shift due to the path length difference in second arm 262 is negative $2\pi/3$ based on the wavelength of the millimeter wave in energy. The phase shift due to the path length difference in the third arm 263 is positive $2\pi/3$, again based on the wavelength of the millimeter wave in energy. Recombination of the three arms by connection to output waveguide 270 results in recombination of the phase shifted components. All three arms of the interferometer differ in length so as to introduce a specific phase shift. Although more than three arms can be used, at least three arms are required to achieve a complete coverage of 0° to 360° for the outgoing wave.

Figure 4:
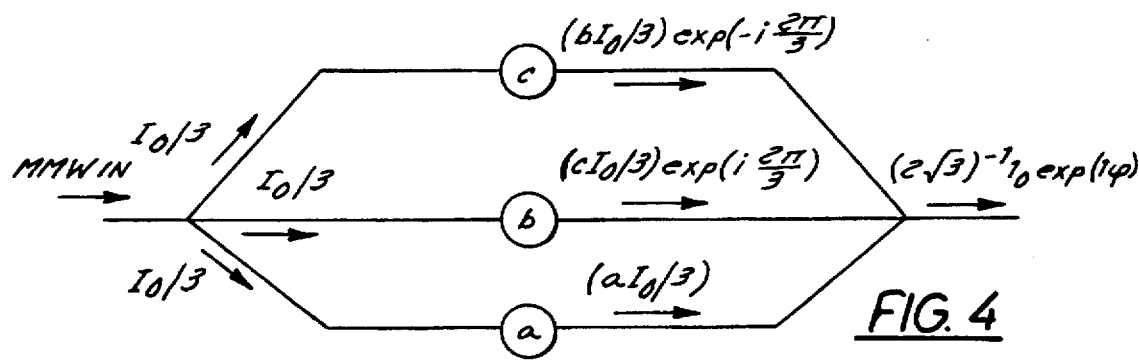
FIG. 4 illustrates a schematic diagram of a three-arm interferometer phase shifter according to the present invention.

Referring now to FIG. 4, the three arm interferometer can be depicted in a more schematic matter by representing the plasma induced modulators with blocks that are labeled with the transmission coefficients a,b and c. For example, FIG. 4 shows a schematic diagram of a three-arm interferometer phase shifter where ($I_{out}$=f(a,b,c)). In each of the three arms, the length of the illuminated area and the intensity of illumination determine the absorption of the MMW and hence the transmission coefficient a, b or c.

The output signal $I_{out}$ depends on the transmission coefficients a, b, and c of the arms (a,b,c≦1), according to the formula:

$$I_{out}(a,b,c)=aI_o/3+(bI_o/3)\exp(2\pi i/3)+(cI_o/3)\exp(-2\pi i/3), \quad (1)$$

where $I_o$ is the input signal and the splitter losses are neglected. The proper choice of the coefficients a, b and c produces an output signal of any desired phase shift $\phi$.

Figure 5:
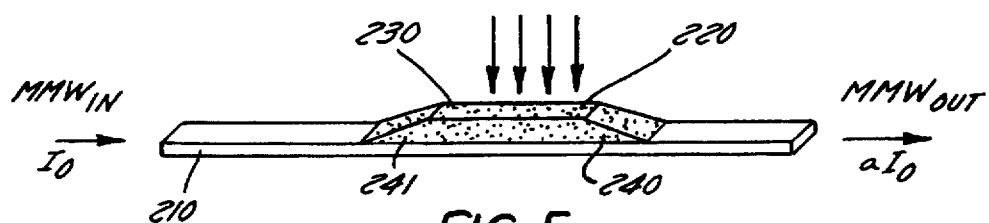
FIG. 5 illustrates a schematic perspective view of a plasma-induced modulator according to the present invention.

Referring now to FIG. 5, a portion of one arm of a three arm interferometer is shown in more structural detail. The illustrated structure can be termed a plasma-induced modulator. Single-mode dielectric waveguide 210 conducts millimeter wavelength energy with an intensity $I_o$ at a proximal end of dielectric waveguide 210. Silicon layer 220 is connected to dielectric waveguide 210. An electron-hole plasma 230 is created within silicon layer 220 upon illumination, which illumination is represented by the four downward pointing parallel arrowheads. Illuminating the silicon layer 220 excites within it an electron-hole plasma that changes the dielectric constant of the silicon material. At low illumination, the biggest change in the dielectric constant occurs in its imaginary part $I_m(\epsilon)$. Thus, the plasma effectively absorbs MMW, thereby reducing $I_o$. Silicon layer 220 includes a proximal tapered end 241 and distal tapered end 240. The plasma 230 created in silicon layer 220 attenuates the millimeter wave energy resulting in an output millimeter wave energy with an intensity $aI_o$ at a distal end of waveguide 210.

Figure 6:
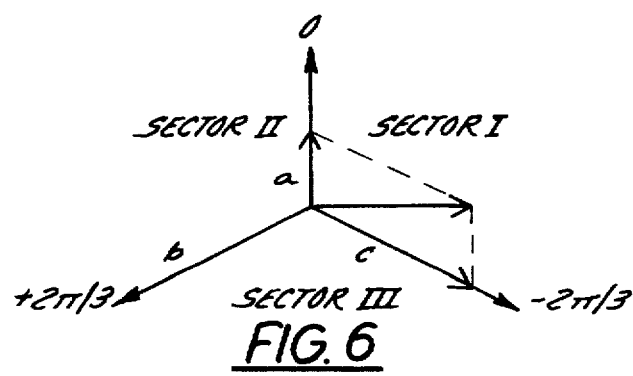
FIG. 6 illustrates basic vectors corresponding to the millimeter wave phase shifts generated in the three arms of the interferometers shown in FIGS. 3–4 according to the present invention.

Referring now to FIG. 6, the phase shift of the millimeter wave output can be represented graphically (or with vector notation). FIG. 6 shows basic vectors corresponding to the MMW phase shifts generated in the three arms of the interferometer. The angles between the basic vectors are $2/3\pi$. Any desired in-plane vector can be reconstructed as the weighted sum of a pair of the three basic vectors.

For example, to obtain an arbitrary phase shift within the zone labeled Sector I in FIG. 6, transmission coefficient b can be chosen to =0. Then, the required coefficients a and c can be calculated. Since there is a 120° rotation symmetry, any phase shift in Sectors II and III can be attained in a similar manner.

Figure 7:
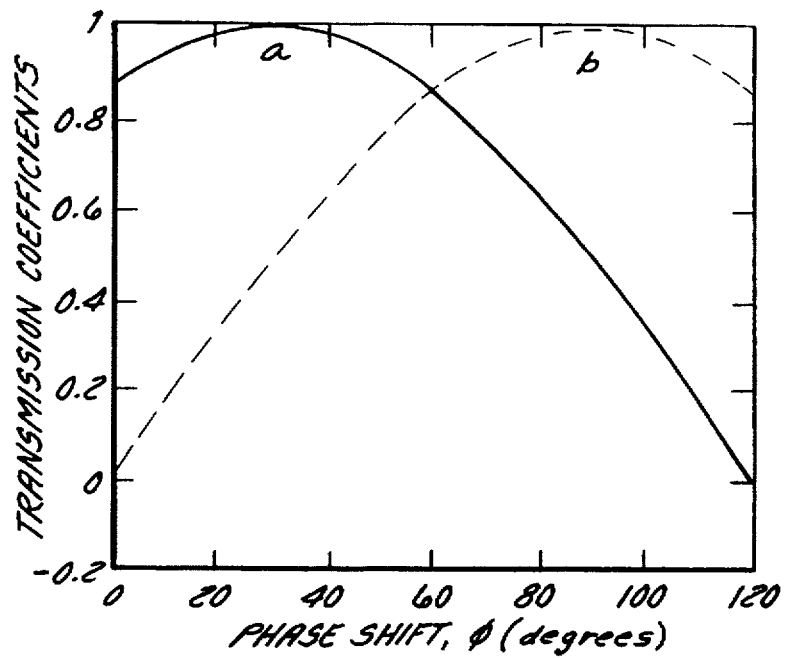
FIG. 7 illustrates transmission coefficients for the plasma induced modulators a and c of FIG. 6 as a function of desired phase shift, where coefficient b is 0, according to the present invention.

Referring now to FIG. 7, selecting the proper transmission coefficients for coefficients a and c can produce any phase shift between 0 and $2\pi/3$, when coefficient b=0. It will be appreciated by those of skill in the art that the intensity of the output signal is a function of the transmission coefficients.

B. First Integrated Panel Embodiment

Figure 8:
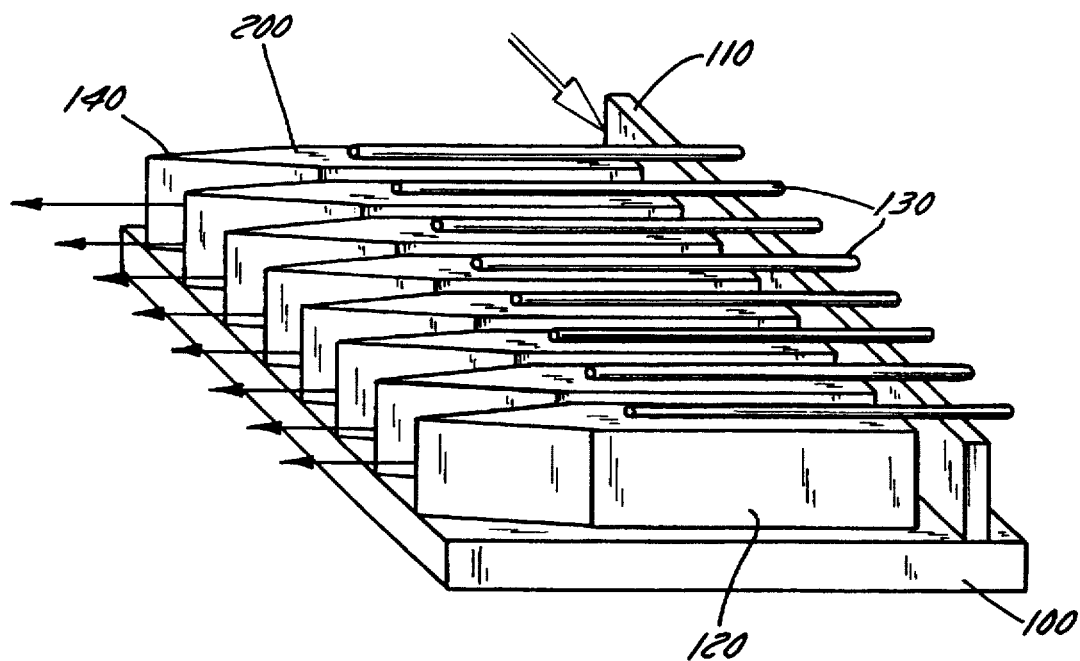
FIG. 8 illustrates a schematic perspective view of an integrated panel according to a first embodiment of the present invention.

Referring to FIG. 8, a first embodiment of an integrated panel according to the present invention is shown. Substrate 100 provides a base for the remaining components of integrated panel 200. Microwave feeder 110 is connected to substrate 100. Microwave feeder 110 is a waveguide that conducts the input microwave energy represented by the large single arrow in the upper right hand portion of the Figure. Ribs 120 are connected to substrate 100. Ribs 120 are electromagnetically coupled to microwave feeder 110. Optical fibers 130 are connected to ribs 120. The input microwave energy that is coupled from microwave feeder 110 to ribs 120 is emitted from integrated panel 200 as represented by the plurality of parallel arrowheads in the left portion of the figure. Ribs 120 include tapered ends 140.

The feeder 110 distributes the microwave signal among the ribs (arm waveguides) with a relative phase shift $$\Delta\phi=2\pi n_{\mathit{eff}}d/\lambda,$$

where d is a spacing between the ribs, $n_{\mathit{eff}}$ is an effective refraction coefficient such that $$n_{\mathit{eff}}=\beta/K_o,$$

$\beta$ is a propagation constant in the feeder waveguide, $K_o$ is a free space wavenumber for the microwave signal and $\lambda$ is the wavelength of the microwave signal such that $$K_o=2\pi/\lambda.$$

To obtain flexible scanning capabilities, the spacing should be $d\leq\lambda/3$. The preferable value of d is $$\lambda/5\leq d\leq\lambda/4.$$

FIG. 8 shows a building block of an antenna array with an integrated waveguide feed and fiber optic control. The building block is an array of ribs fed through a dielectric waveguide and integrated with optical fibers into a monolithic panel.

Figure 41:
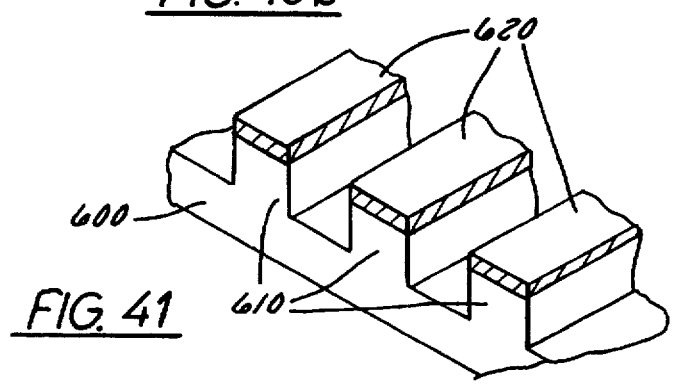
FIG. 41 illustrates a perspective view of a plurality of arms with nonphotosensitive waveguides according to the present invention.

More generally, the ribs are made of, or include inserts of, photosensitive material such as silicon or another semiconductor. Thus, the ribs can be photosensitive waveguides or, alternatively, include nonphotosensitive waveguides, (e.g., as shown in FIG. 41). Under illumination, an electron-hole plasma is generated within the photosensitive material and the presence of the plasma modulates the propagation of microwaves along the ribs. The degree of modulation is proportional to the level of illumination. The optical power required for modulation control is delivered by optical fibers.

In a preferred embodiment, the rib waveguides are illuminated individually using a fiber-optic light distribution system. The illumination does not require coherent sources. Therefore, inexpensive multimode fibers and light emitting diodes (LEDs) can be used as light sources. To couple light from the fiber to a rib, the cladding layer can be removed from the end part of the fiber followed by grinding the core of the fiber to make its surface rough. The fiber can be attached to the rib with a layer of indium tin oxide so as to inhibit MMW leakage.

To control the integrated panel, each of the radiating/ receiving ribs can be illuminated by its own LED. LEDs with peak output power of 10 mW and radiating at wavelengths of 780 to 940 nm are appropriate. Such LEDs are commercially available, inexpensive and require a bias current of less than 100 mA (with electrical peak power less than 150 mW).

In the transmit mode, the microwave signal is fed into the feeder 110 and then sequentially coupled into each rib waveguide with a corresponding delay, due to path length. The amount of radiation emitted by each rib is controlled by semiconductor/light interaction, so that a desired emission pattern can be formed based on far-field recombination. Far-field recombination occurs in free space without any apparatus.

Since all the antenna elements are passive, the antenna will operate in both transmit and receive modes without a need for switching. The feed into the ribs can be implemented over an air gap in a direction perpendicular to the feeder waveguide (no lossy, tight radius waveguide curves are needed). The microwave propagation in each rib is directly controlled with light by means of the photoinduced plasma. Complete beam steering by means of far-field recombination is achieved by amplitude modulation only.

Figure 9:
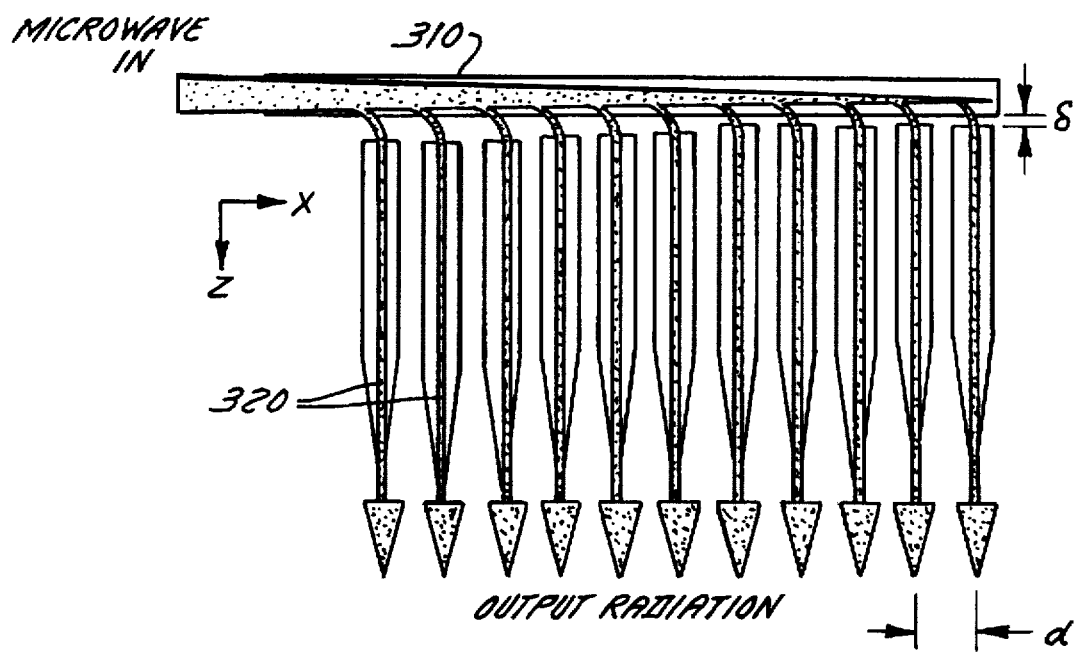
FIG. 9 illustrates a schematic top plan view of a nonilluminated integrated panel according to the first embodiment of the present invention.

Referring now to FIG. 9, a schematic top view of a nonilluminated integrated panel is shown. The optical fibers seen in FIG. 8 are not shown in FIG. 9. Still referring to FIG. 9, the arrowheads at the bottom of the drawing show microwave radiation coupling out of the ribs, the width of the line inside the feeder waveguide thinning as the energy leaks out. The integrated panel contains one feeder waveguide 310 and an array of tapered ribs 320. The propagation constant for the microwave energy propagating along the feeder waveguide, (i.e., $\beta$) will be $>K_o$, where $K_o$ is the free space propagation constant. The distance between the ribs, d, should be less than or equal to $\lambda/3$ to achieve a good far-field pattern. It is this adjustment that permits the dense packaging of the rib array so the 120° phase separation is attained within a very small linear distance along the x axis. The microwave energy launched into the feeder 310 couples into the individual elementary ribs and thereafter traveling through the ribs eventually radiates out into free space. The gap between the feeder and the elementary ribs is a function of the x coordinate. Selecting the gap allows a uniform coupling to be obtained or, in general, a specific coupling pattern required for a desired shape of the radiation envelope.

Although for the sake of simplicity, it can be assumed that the microwaves propagate along the ribs without cross-talk, cross-talk does exist. However, cross-talk will only affect the strength of modulation that is to be generated in each elementary rib and can be readily accounted for. Although only the transmit mode is being depicted in FIG. 9, the operation of the integrated panel will be the same in the "receive" mode except that the direction of the energy flow is reversed.

Figure 10:
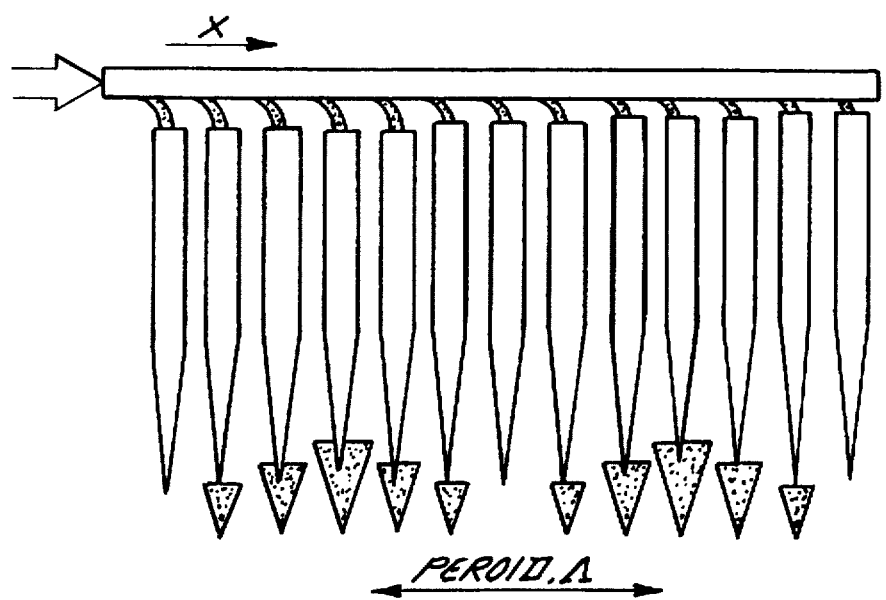
FIG. 10 illustrates a schematic top plan view of an illuminated integrated panel according to the first embodiment of the present invention.

Referring now to FIG. 10, by collectively applying to the illuminated integrated panel individually controlled modulation of the propagating microwave energy, beam steering can be obtained. Consider, as one of the possible embodiments, a periodic modulation pattern (i.e., a periodic distribution of microwave attenuation in the rib array along the x-axis). For example, assume a nonlinear coupling coefficient between the ribs and the feeder waveguide. Then, when a sinusoidal attenuation function is collectively imposed upon the rib waveguides, the output radiation becomes quasi-sinusoidal. FIG. 10 shows such a periodically distributed transmission of microwaves through the rib waveguide array. Specifically, the output power is proportional to the size of the downward pointing arrows.

As noted above, tremendous weight savings can be achieved because it is not necessary to recombine the arms at the antenna plane. In the far field of the antenna, free-space recombination will occur by itself. In contrast, the above-described three-arm interferometer includes structure for recombining the three components within the apparatus. Moreover, all arms of the integrated panel can have a single common feeder so that the $2\pi/3$ phase shift between arms is provided by the feed.

Such a controlled integrated panel forms a beam propagating in the direction determined by the period $\Lambda$ of the imposed sinusoidal function, according to the equation:

$$\alpha = \arcsin(n_{\it eff} \cdot \lambda/\Lambda), \tag{2}$$

where $\alpha$ is the desired angle from the boresight. The shape of the beam and the side lobes can be controlled by selecting the distribution of the power radiated by each rib waveguide through variation of the gap $\delta$.

Referring now to FIGS. 11A–C, three examples of attenuation distribution in an integrated panel are shown. Specifically, FIGS. 11A–C show the distribution of power radiated by an integrated panel having a panel length of 15 inches, a spacing between elements of 2 mm. Thus, the number of rib waveguides composing the integrated panel is 190.

A typical attenuation of the microwave power within the radiating/transmitting blocks is at the level of 3 dB. This is taken into consideration in the periodic patterns shown in FIGS. 11A–C.

Referring now to FIGS. 12A–C, the resulting beam patterns are shown for the power distributions shown in FIGS. 11A–C, respectively. The beam patterns shown in FIGS. 12A–C were produced by computer simulation. The integrated panel parameters used in the simulation are as follows: the integrated panel material is silicon with a dielectric permittivity $\epsilon = 11.9$, an effective refraction coefficient $n_{\it eff} = 3.0$ and the MMW frequency is 10 GHz. FIGS. 12A–C demonstrate excellent beam steering capability. Specifically, $\pm 60°$ scanning is evident with very low sidelobes (e.g., $<-23$ dB). Any desired modulation distribution can be implemented, resulting in a unique flexibility in generating desired beam patterns for various additional radar functions (e.g., null steering, multiple beam scanning and others).

Figure 13:
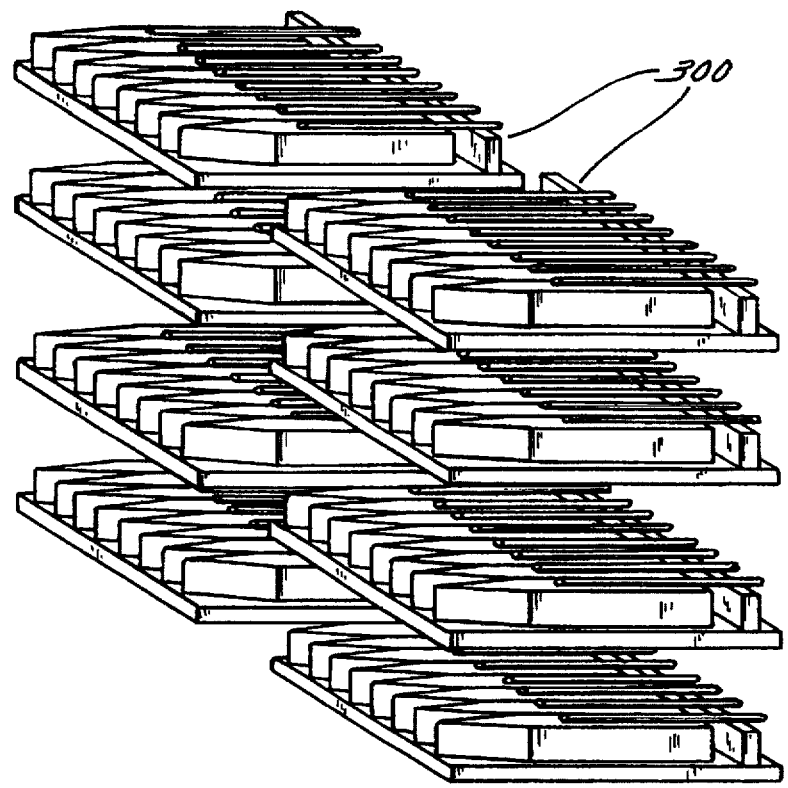
FIG. 13 illustrates a schematic perspective view of an array of a plurality of integrated panels according to the first embodiment of the present invention.

Referring now to FIG. 13, it will be appreciated that the integrated panel shown in FIG. 8 represents an elementary building block which can be multiplied for the creation of a 2-D scanning antenna. FIG. 13 shows an antenna array consisting of eight integrated panels. Integrated panels 300 are stacked vertically and the vertical stacks are arranged in a horizontal series. Each of the integrated panels 300 is oriented with its base in one common direction and its tapered ends in a second common direction. In this way, each of the integrated panels 300 is a module in a much larger antenna array. The performance of the entire antenna will be determined by the parameters of the individual integrated panels.

Figure 14:
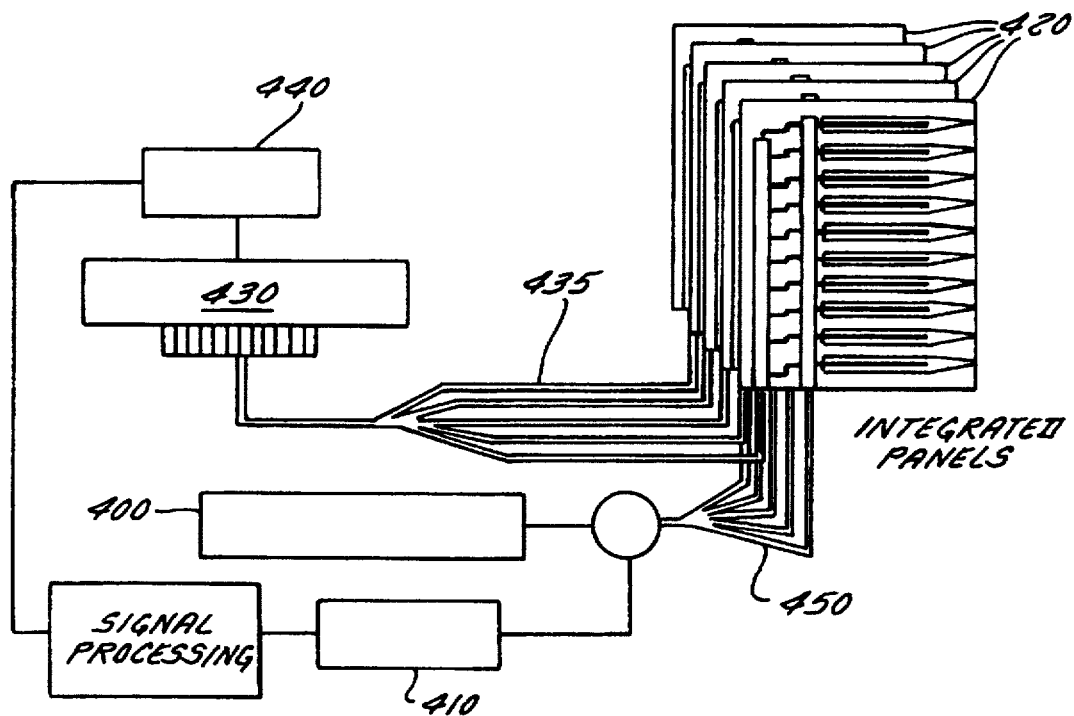
FIG. 14 illustrates a schematic diagram of a radar system including a plurality of integrated panels according to the first embodiment of the present invention.

Referring to FIG. 14, the proposed antenna is a part of a radar system and various other antenna related radar components can be included as part of a system. The components include a microwave source 400 and detector 410, radiating/ receiving blocks of integrated panels 420, an LED matrix 430, and a controller 440 of the LED matrix 430. Radiating blocks are fed by a microwave delivery system 450. There are no phase-shifters or other traditional microwave active elements. The microwave delivery system 450 consist of short-length metal waveguides or microstrip transmission lines, a divider that allows delivery of microwave power from the source to each of the radiating/receiving integrated panels, and from each integrated panel to the detector 410, and a circulator. Each waveguide rib has its own LED. The illumination provided by these LEDs is conducted to the ribs via fiber-optics delivery system 435. The controller 440 generates the required current through each LED via matrix 430 and performs beam forming and scanning functions. A CPU synchronizes the operation of the above components and generates the desired output.

Referring now to FIGS. 15A–C, one method of fabricating the first integrated embodiment of the panel is illustrated. In this method, the integrated panel is fabricated from a monocrystaline silicon ingot of a high purity. High purity ensures low losses in the nonilluminated portions of the silicon and a long carrier lifetime. One of the best techniques to grow an ingot of suitable purity is the float zone technique. This technique allows an initial carrier density much lower than $10^{12} cm^{-3}$. FIG. 15A shows a silicon ingot grown in the <111> direction by the float zone technique. FIG. 15B shows a prism cut from the ingot with walls parallel to the (111) and (110) planes. Then, using photolithography deep etching is performed. FIG. 15C shows orientation-dependent deep etching. An etch solution with very high anisotropy can be used. For example, the etching can be performed at a temperature of 80° C. with a mixture of 50% KOH and 50% $H_2O$. This mixture etches 700 times faster in the <110> direction than in the <111> direction.

Referring to FIG. 41, the integrated panel can also be based on a waveguide array in which each of a plurality of arms includes a nonphotosensitive rib waveguide provided that each of the arms also includes a photosensitive semiconductive plasma injector connected to the nonphotosensitive rib. A plurality of dielectric ribs 610 are formed in a dielectric material 600. A photosensitive layer 620 is located adjacent each of the plurality of dielectric ribs. This design has the unexpected advantageous result that far less (2 to 3 orders of magnitude) optical pumping power is required to attenuate the microwave signal in the ribs. Anisotropic etching can be used to fabricate such a waveguide array without undue experimentation.

C. Second Integrated Panel Embodiment

The proposed antenna operation principle is applicable to different antenna designs. A second embodiment of the invention is based on microstrip technology, which technology is widely accepted for fabrication of millimeter integrated circuits (MMICs). The advantages of this approach are compactness, a highly developed and cost effective fabrication technique and compatibility with other MMIC elements.

Figure 16:
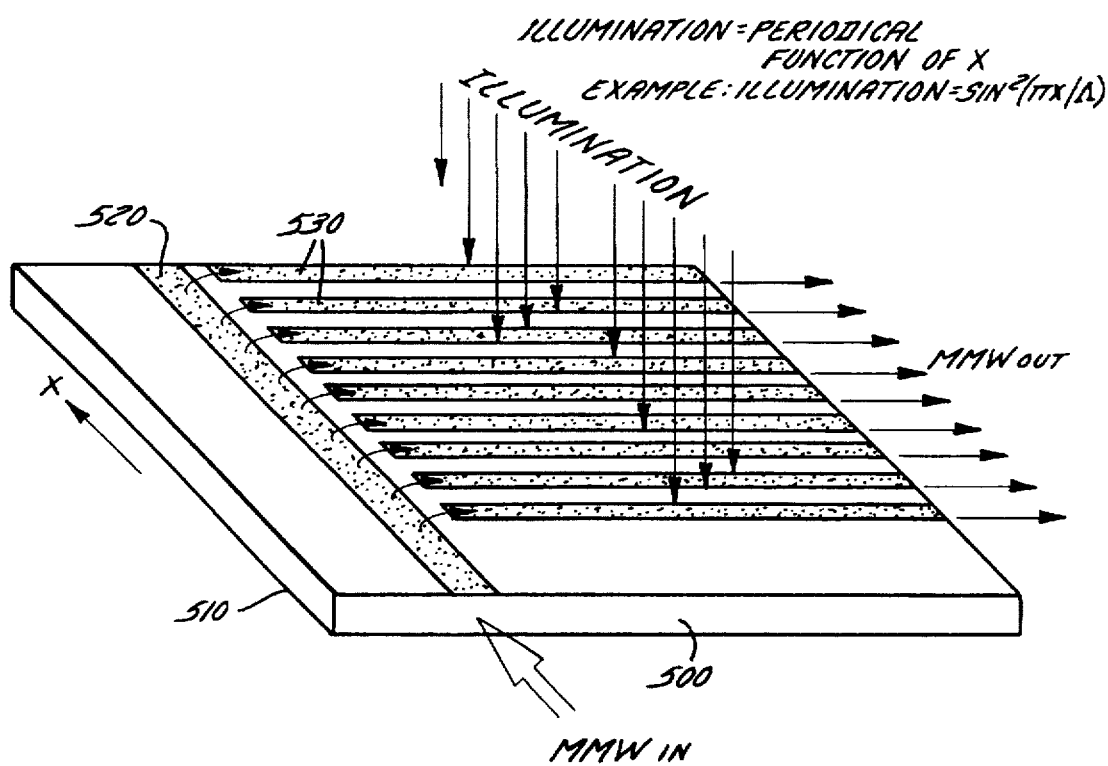
FIG. 16 illustrates a schematic perspective view of an integrated panel according to a second embodiment of the present invention.

Referring now to FIG. 16, an example of an integrated panel according to the second embodiment of the invention is shown. The second embodiment is a microstrip integrated panel controlled by light based on the same operation principal as the first embodiment of the invention.

The microstrip integrated panel includes a photosensitive semiconductor substrate 500 (e.g., silicon plate), and a ground metal layer 510 on one side of the substrate 500. On the other side of the substrate 500 there is provided a main feeder strip 520 propagating in direction x and a set of metal strips 530 propagating in a direction normal, or approximately normal, to the direction x.

Figure 17:
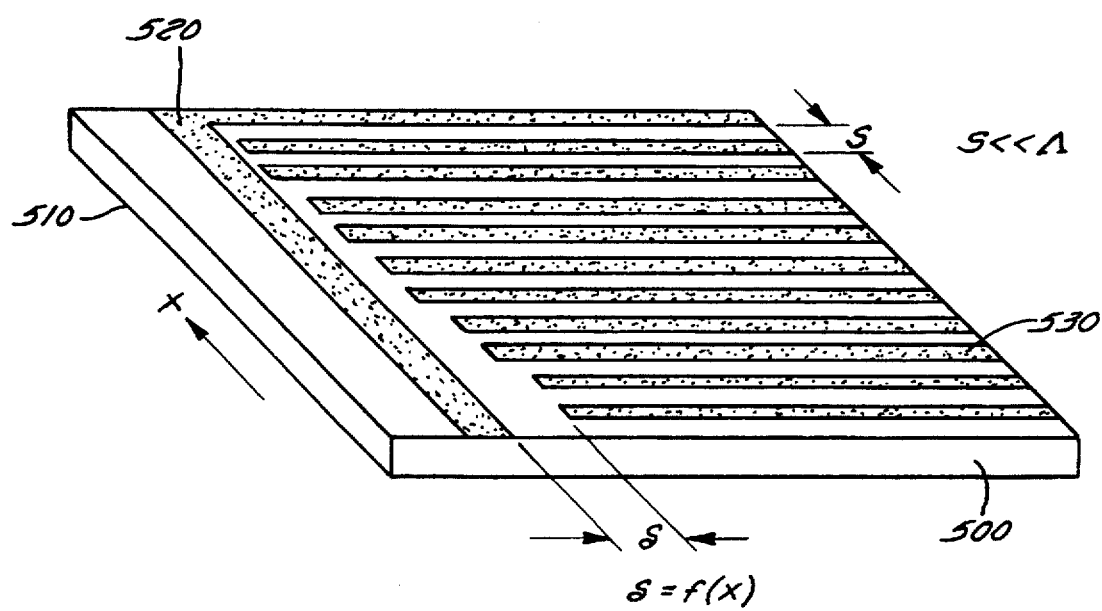
FIG. 17 illustrates a schematic perspective view of an integrated panel according to the second embodiment of the present invention.

Referring now to FIG. 17, the distance d between the metal strips 530 should be much smaller than the parameter $\Lambda$ where $$\Lambda = \lambda/(n_{eff} - \sin(\alpha)). \tag{3}$$

The substrate 500 is a radiating element and is illuminated with the light that creates an electron-hole plasma directly in the semiconductor substrate 500. The area proximate the main feeder strip 520 is not illuminated because the closest illuminating point should be not closer than 5–6 diffusion lengths of the plasma carriers. As was the case in the first embodiment, illumination intensity of substrate 500 is a periodical function with the period $\Lambda$. The same formulas can be applied as in the first embodiment, but with substitution of $n_{eff}$ for the structure defined by the main feeder strip 520.

Still referring to FIG. 17, to tailor the required beam pattern, the coupling coefficient between the main feeder strip 520 and metal strips 530 along the x-direction can be varied. The most convenient way is to simply vary the gap $\delta$ between the main feeder strip 520 and the metal strips 530.

Figure 18:
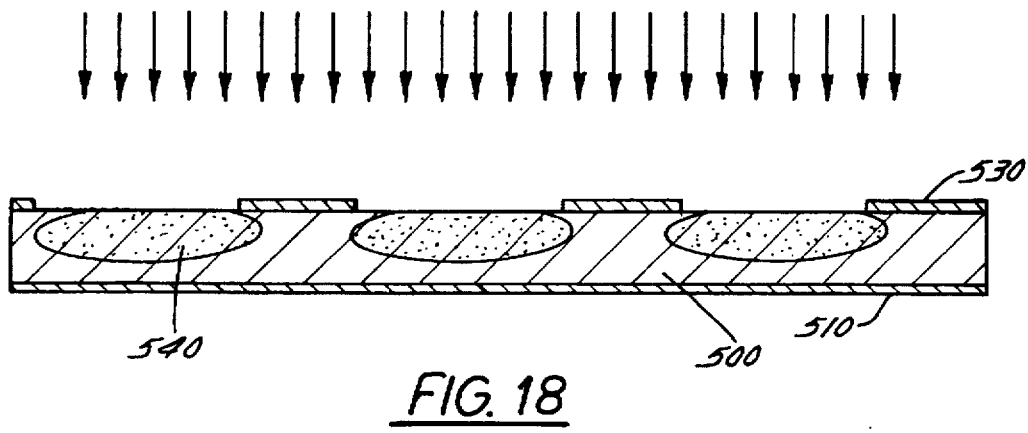
FIG. 18 illustrates a schematic cross-sectional view of an integrated panel according to the second embodiment of the present invention.

Referring now to FIG. 18, illumination, represented by the downward pointing arrowheads, creates an electron-hole plasma 540 in the area between the metal strips 530. Some part of the plasma 540 diffuses from the illuminated area to under the metal strips 530. The plasma 540 between the metal strips 530 effects propagation of the surface waves and the plasma that diffused to under the strips effects the propagation of the guided waves. By individually controlling the amount of light that is directed to the areas between metal strips 530, the output radiation at the end of the semiconductor substrate can be controlled. The theoretical model describing the radiating beam pattern is the same as for the first embodiment of the invention.

Figure 19:
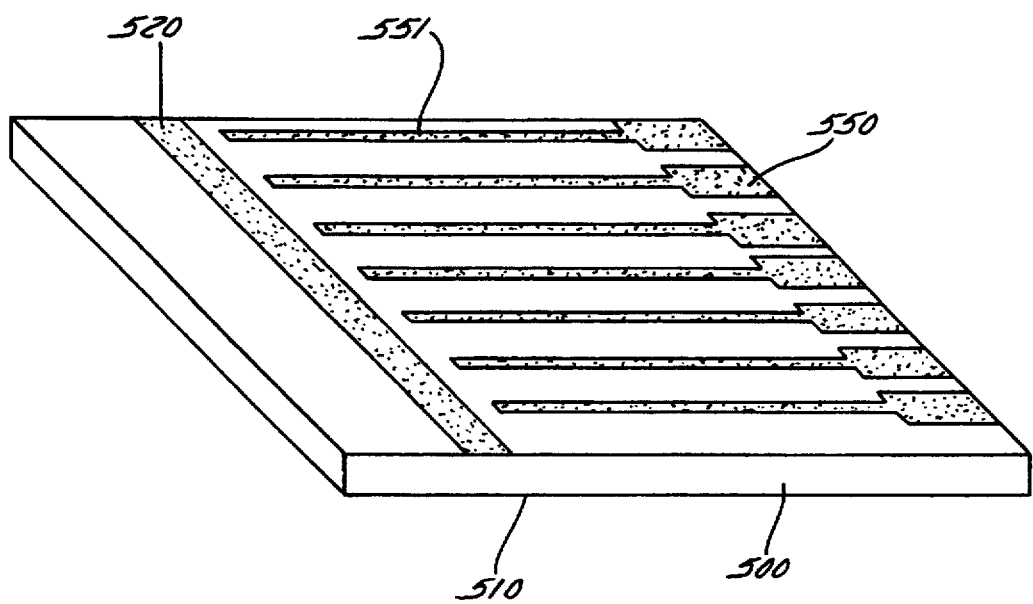
FIG. 19 illustrates a schematic perspective view of an integrated panel according to the second embodiment of the present invention.

Referring now to FIG. 19, metal strips 551 can include radiating patches 550. Various designs of the radiating ends of the metal strips are possible.

Figure 20:
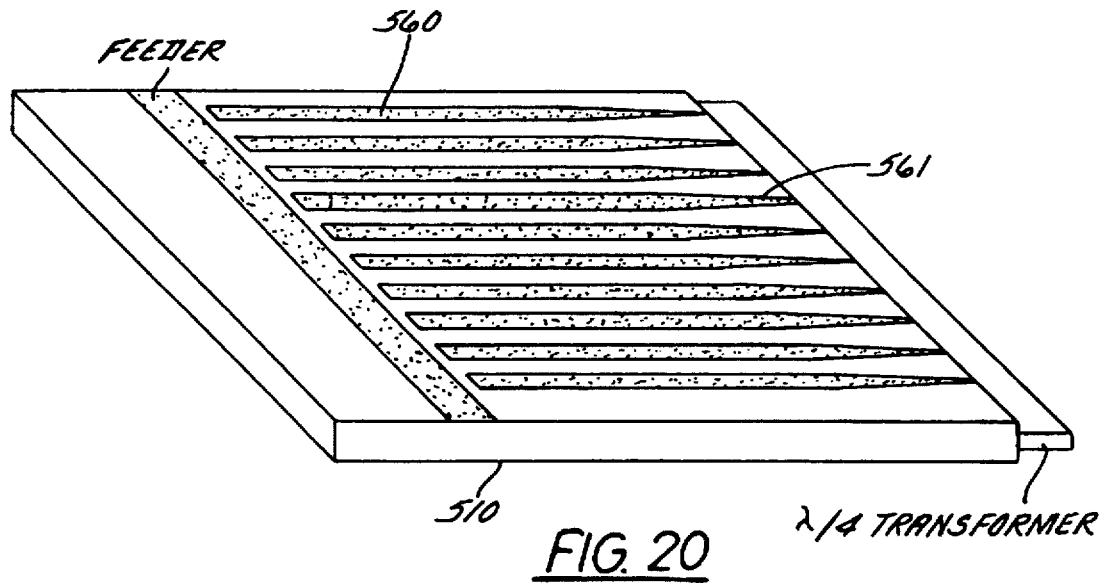
FIG. 20 illustrates a schematic perspective view of an integrated panel according to the second embodiment of the present invention.

Referring now to FIG. 20, metal strips 561 can include tapering ends. To lower the parasitic back reflection from the output side of the substrate, a quarter-wavelength transformer can be provided.

Figure 21:
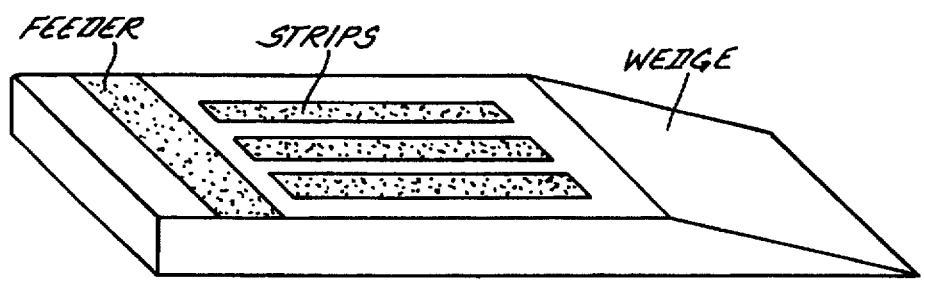
FIG. 21 illustrates a schematic perspective view of an integrated panel according to the second embodiment of the present invention.

Referring now to FIG. 21, a wedge can be provided to lower the parasitic back reflection from the output side of the substrate. The wedge can be an extended structure, as shown, or a much shorter structure.

D. Steering Control

Figure 22:
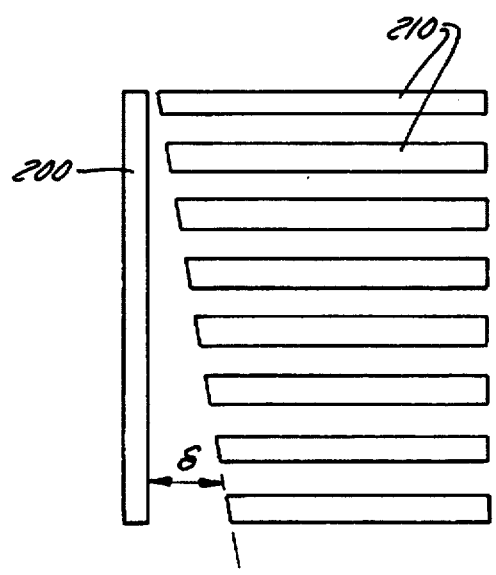
FIG. 22 illustrates a schematic top plan view of the gaps between the feeder waveguide and the rib waveguides in an integrated panel according to the present invention.

Referring to FIG. 22, the gap, $\delta$, between the feeder waveguide 200 and each of the plurality of rib waveguides 210 varies according to a relationship $$\delta = f(K_P) \tag{4}$$

where $K_P$ is a required coupling coefficient between the main feeder and the ribs.

Referring to FIGS. 23–40B, all of these drawings are based on an integrated panel having an aperture length, L=30 mm, a number of ribs, B=60, and a rib spacing, d=0.5 mm. The frequency of operation, f, is constant at 94.3 GHz.

Figure 23:
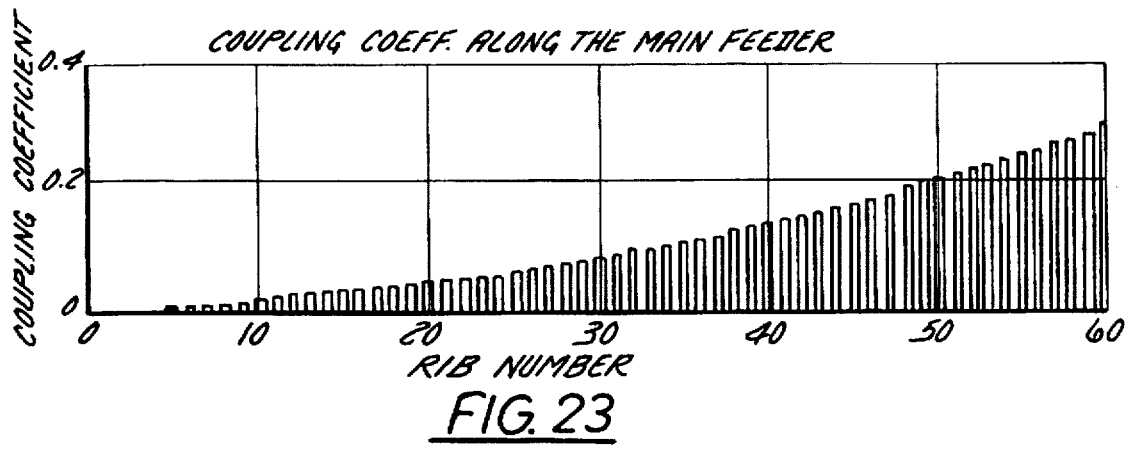
FIG. 23 illustrates coupling coefficient as a function of rib number for a test panel according to the first embodiment of the present invention.

Referring to FIG. 23, $K_P$ can vary according to a relationship $$K_P = 0.3(P/B)^2 \tag{5}$$

where P is the rank number of any particular rib waveguide and B is a total number of rib waveguides in an integrated panel. Thus, $K_P$ can be selected by variation of $\delta$. The function shown in FIG. 23 is completely independent of any illumination of the panel.

Figure 24:
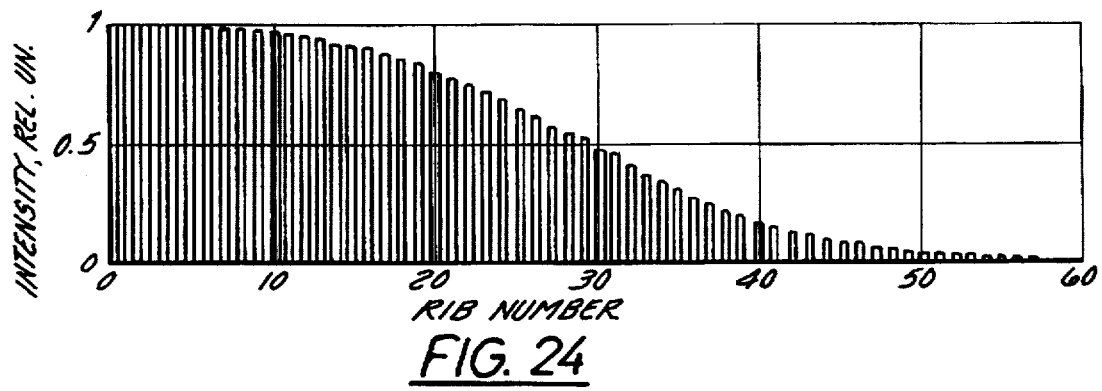
FIG. 24 illustrates relative intensity of the power propagating along the feeder waveguide at the coupling between the feeder waveguide and the $p^{th}$ rib waveguide as a function of rib number for the coupling coefficient function shown in FIG. 23.

Referring to FIG. 24, the power, $Prop_P$, propagating along the main feeder at the coupling between the main feeder and the $P^{th}$ rib varies according to a relationship $$Prop_P = \left[ \prod_{\xi=0}^{P} (1 - K_\xi) \right] \quad (6)$$

The function shown in FIG. 24 is completely independent of any illumination of the panel.

Figure 25:
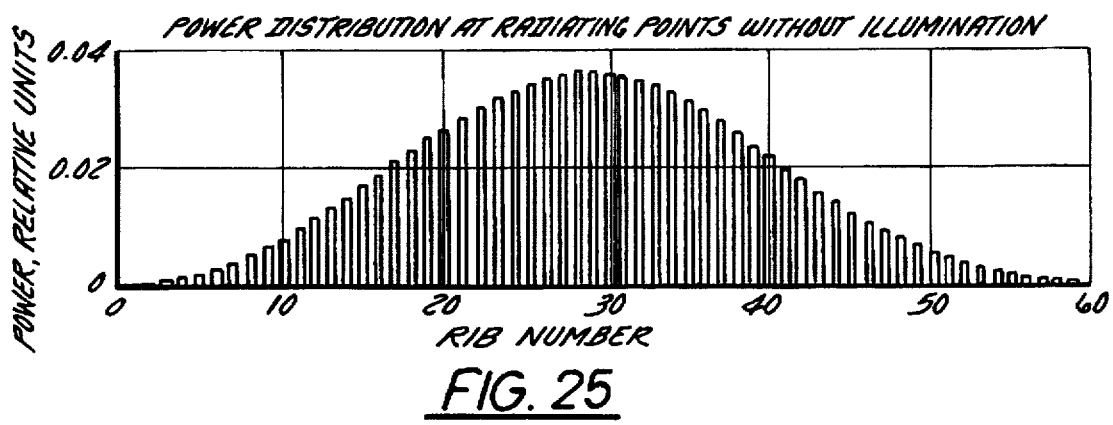
FIG. 25 illustrates relative radiated power as a function of rib number for the relative intensity function shown in FIG. 24.

Referring to FIG. 25, it will be appreciated that the power distribution at the radiating points, without illumination, looks like Gausian. The function shown in FIG. 25 is dependent on the illumination of the panel (the function shown in FIG. 25 being for the nonilluminated condition).

Figure 26:
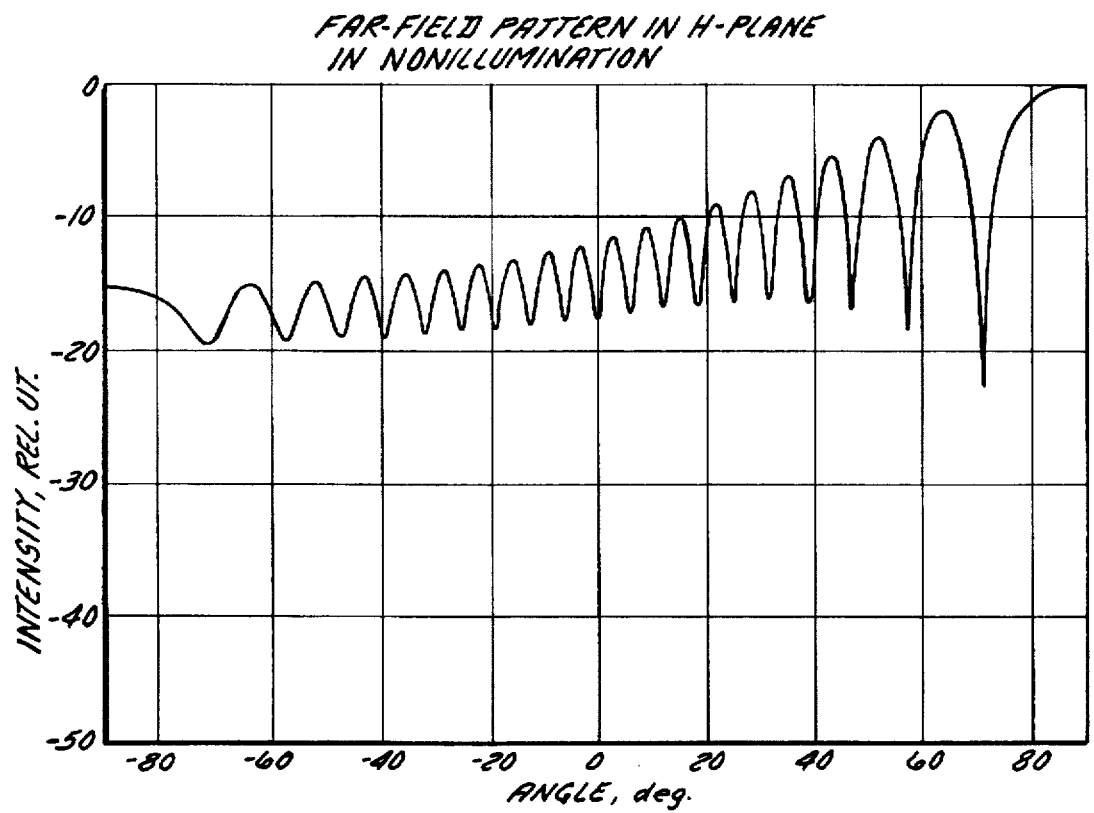
FIG. 26 illustrates far-field intensity as a function of angle for the relative power function shown in FIG. 25.

Referring to FIG. 26, the far-field pattern in the H-plane from the power distribution illustrated in FIG. 25 (nonilluminated) is shown. Of course, in this nonilluminated condition, the beam is not steered.

Figure 27:
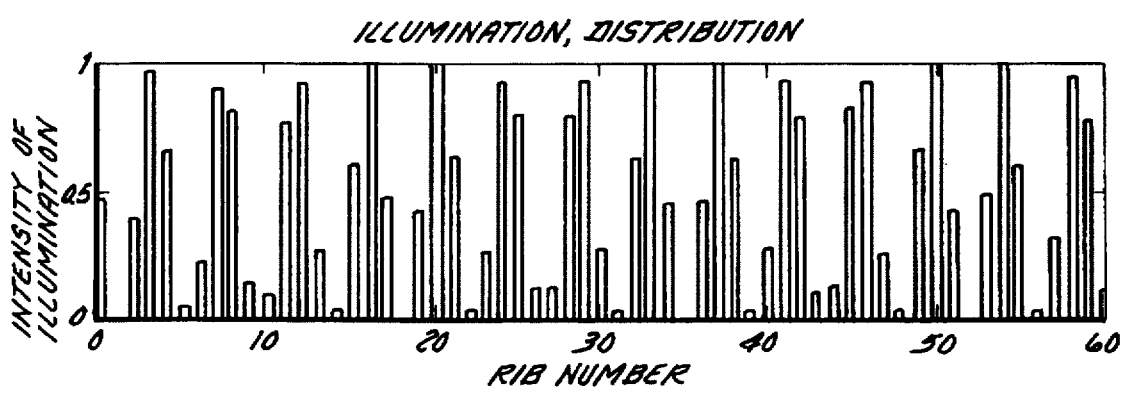
FIG. 27 illustrates intensity of plasma induced modulator (rib) illumination as a function of rib number for the relative intensity function shown in FIG. 24 steered to $\alpha=0°$ according to the present invention.
Figure 28A:
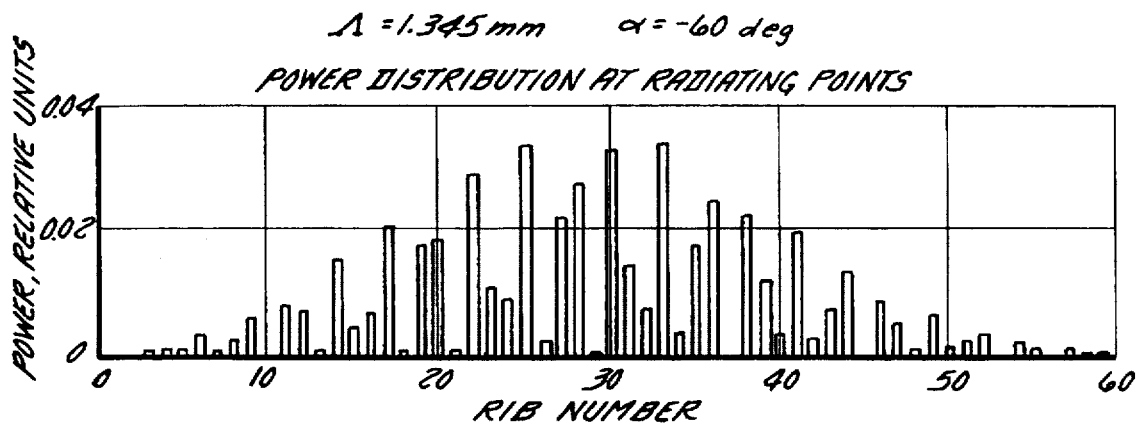
FIG. 28A illustrates relative radiated power as a function of rib number for the test panel steered to $\alpha=-60°$ according to the present invention.
Figure 28B:
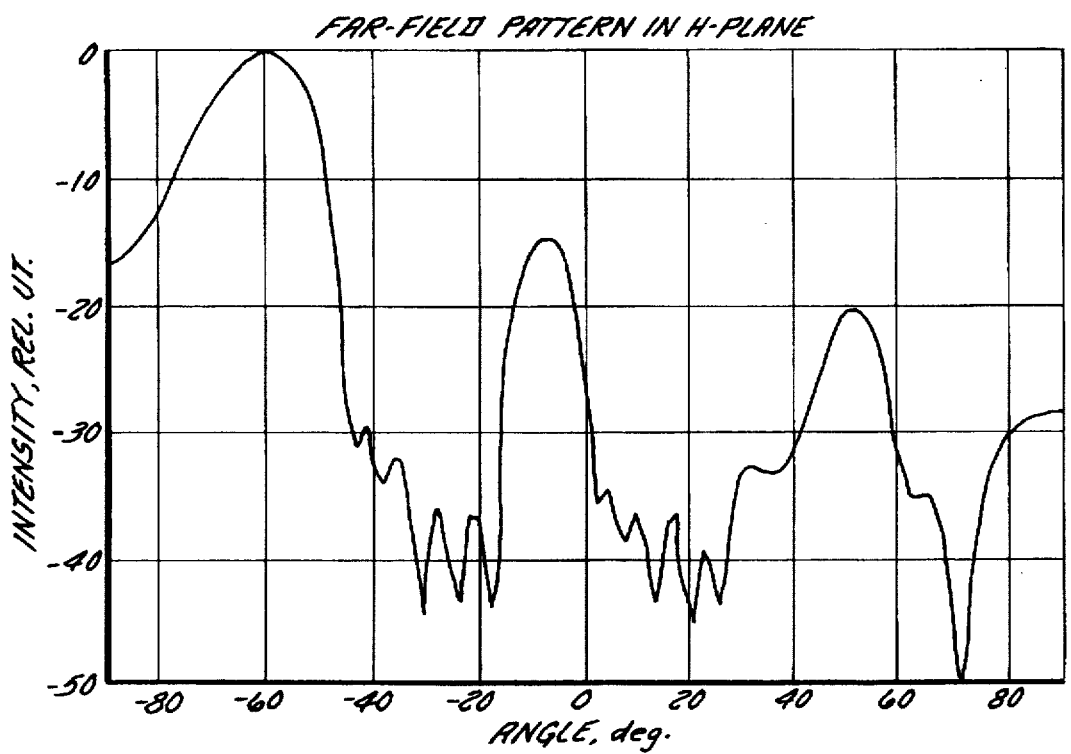
FIG. 28B illustrates far-field intensity as a function of angle for the power function illustrated in FIG. 28A.
Figure 29A:
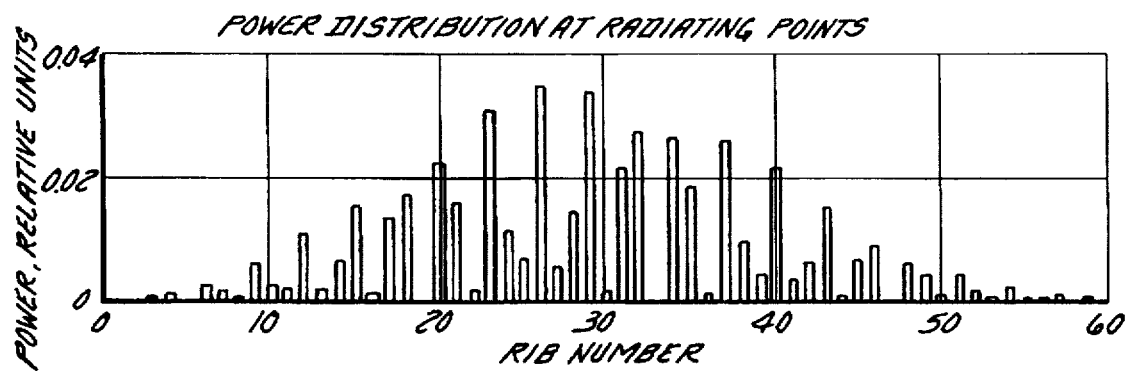
FIG. 29A illustrates relative radiated power as a function of rib number for the test panel steered to $\alpha=-50°$ according to the present invention.
Figure 29B:
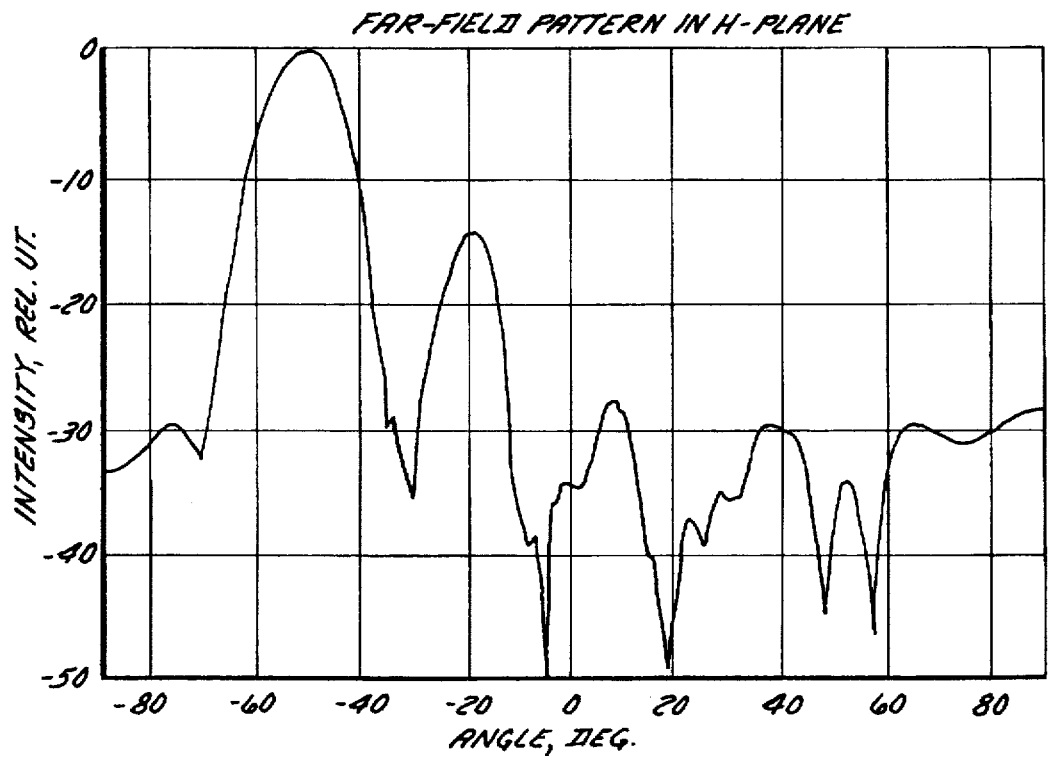
FIG. 29B illustrates far-field intensity as a function of angle for the power function depicted in FIG. 29A.
Figure 30A:
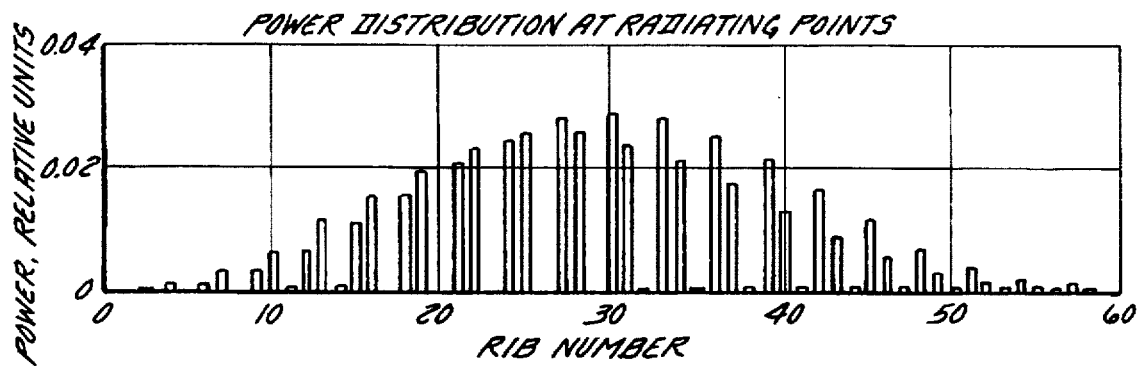
FIG. 30A illustrates relative radiated power as a function of rib number for the test panel steered to $\alpha=-40°$ according to the present invention.
Figure 30B:
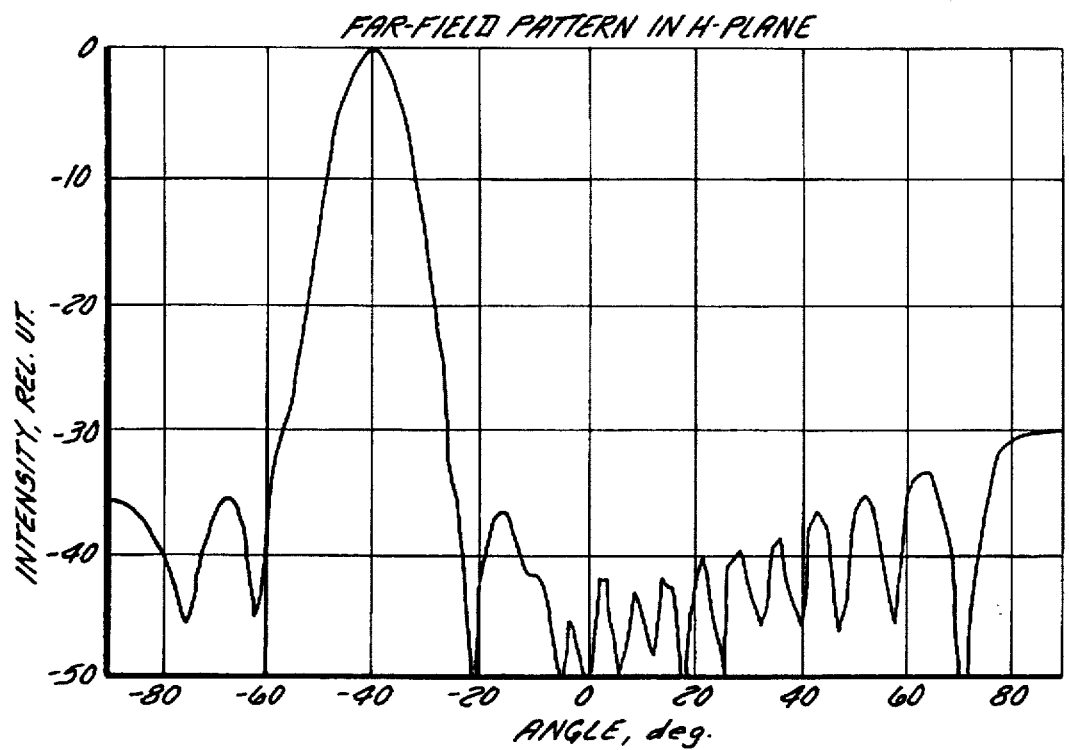
FIG. 30B illustrates far-field intensity as a function of angle for the power function depicted in FIG. 30A.
Figure 31A:
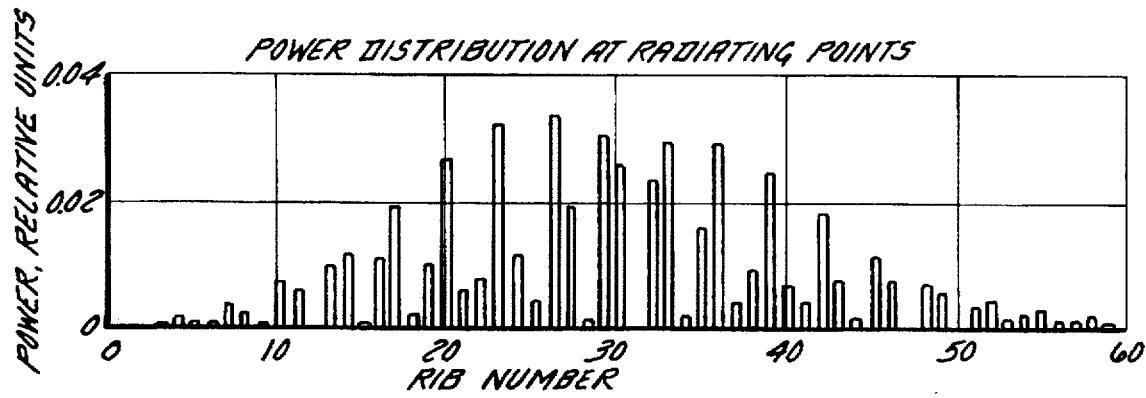
FIG. 31A illustrates relative radiated power as a function of rib number for the test panel steered to $\alpha=-30°$ according to the present invention.
Figure 31B:
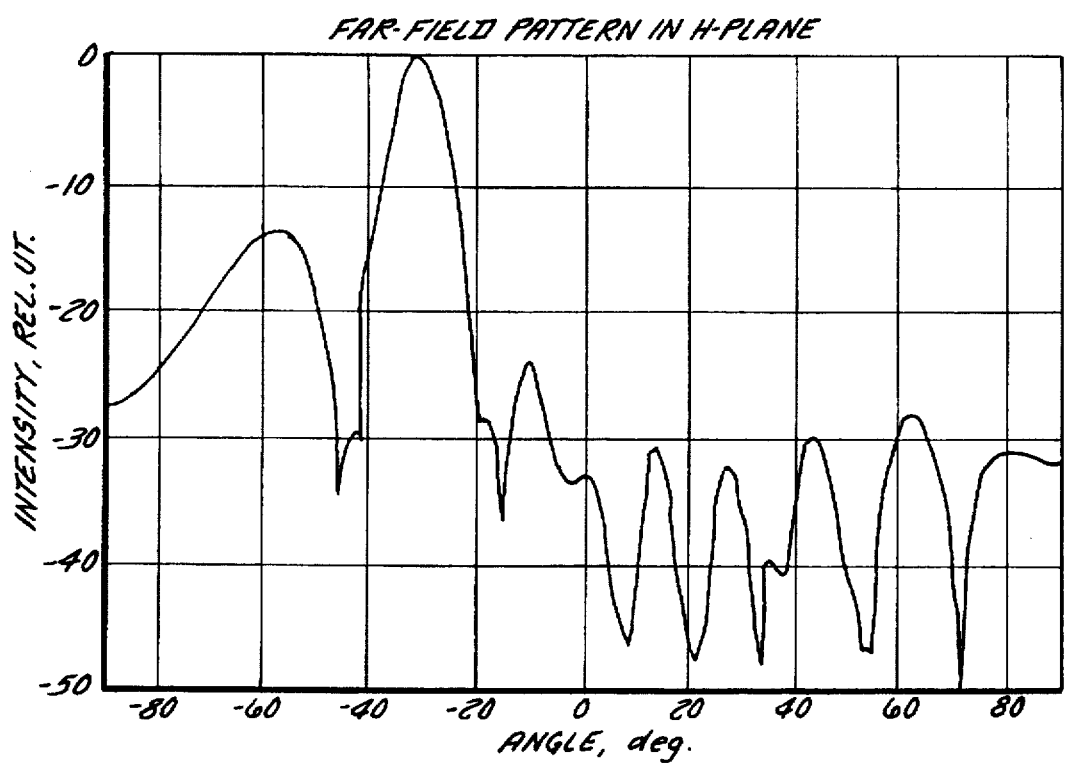
FIG. 31B illustrates far-field intensity as a function of angle for the power function depicted in FIG. 31A.
Figure 32A:
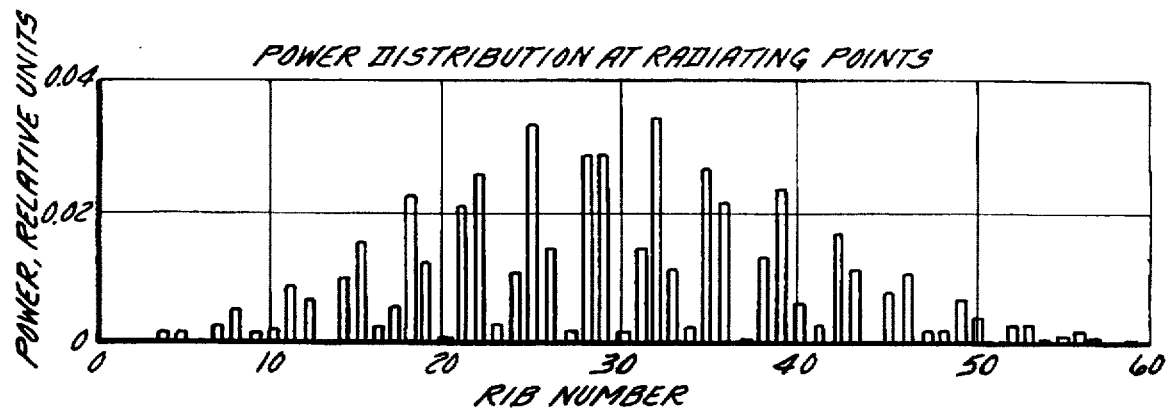
FIG. 32A illustrates relative radiated power as a function of rib number for the test panel steered to $\alpha=-20°$ according to the present invention.
Figure 32B:
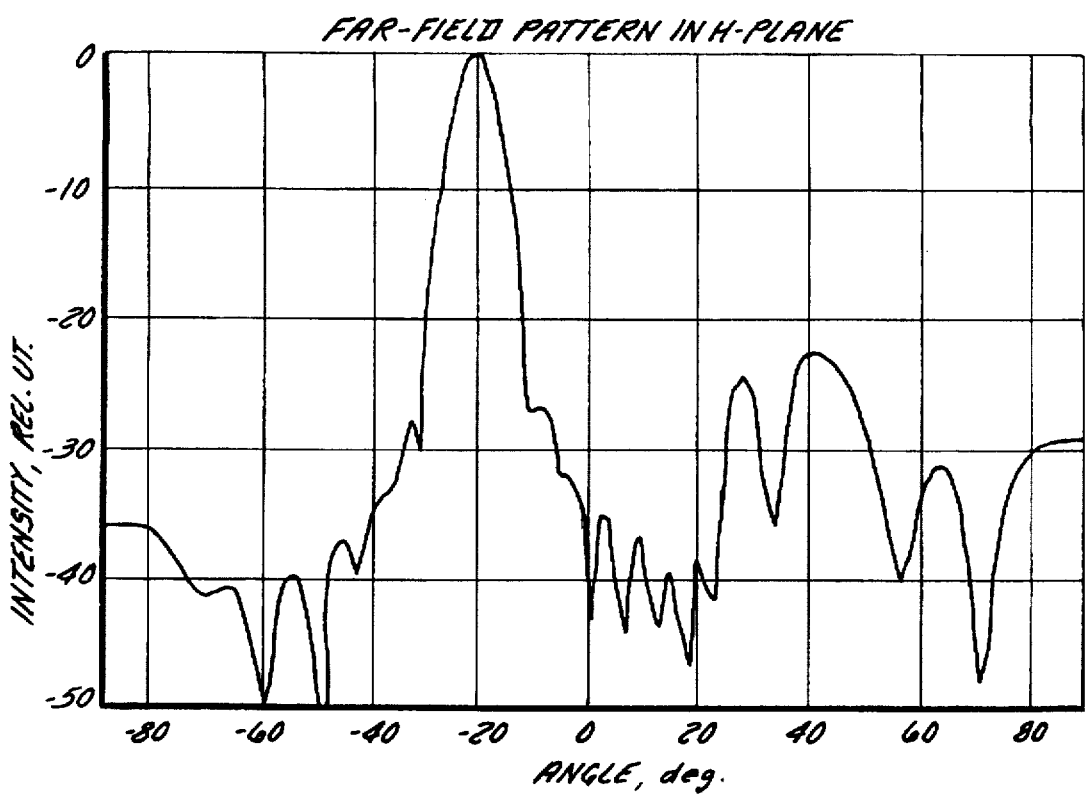
FIG. 32B illustrates far-field intensity as a function of angle for the power function depicted in FIG. 32A.
Figure 33A:
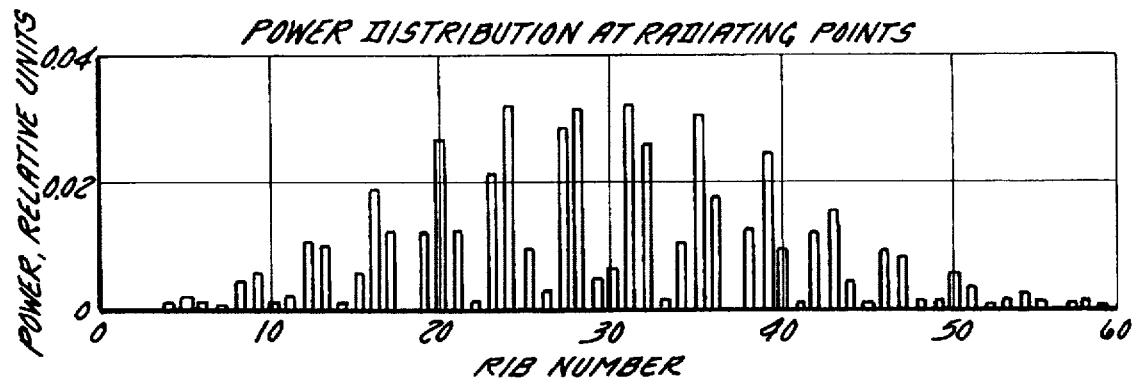
FIG. 33A illustrates relative radiated power as a function of rib number for the test panel steered to $\alpha=-10°$ according to the present invention.
Figure 33B:
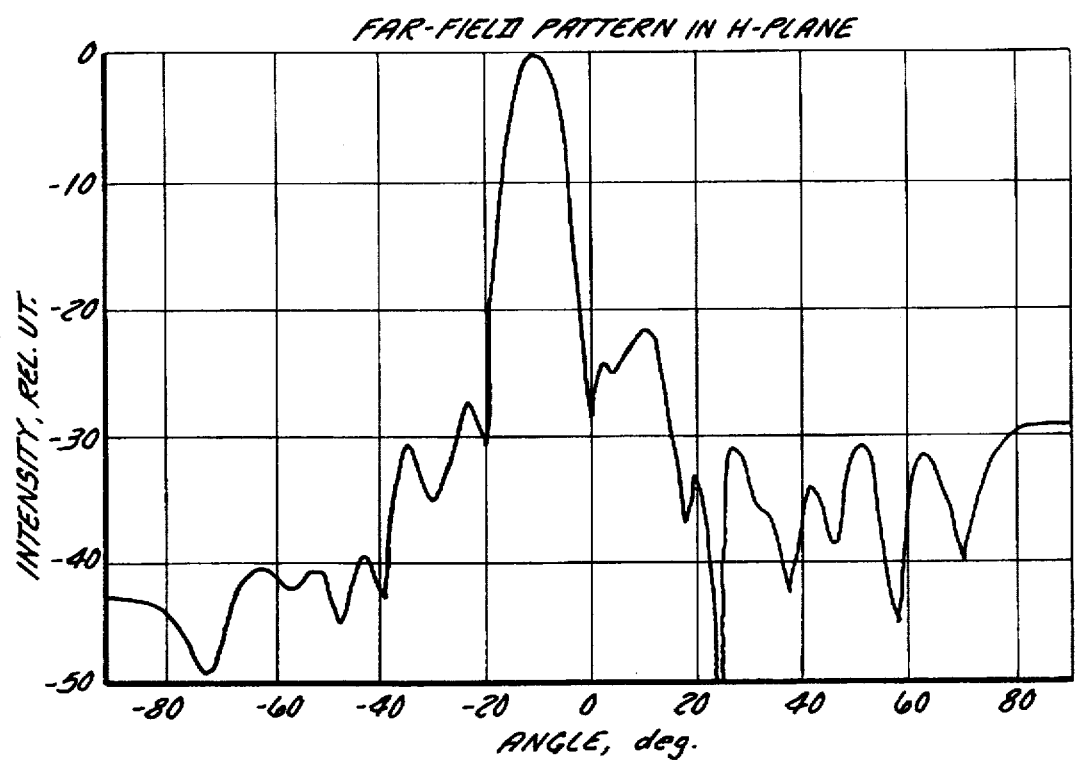
FIG. 33B illustrates far-field intensity as a function of angle for the power function depicted in FIG. 33A.

Referring to FIG. 27, the amplitude modulation illumination distribution for steering angle $\alpha=0$ is shown. In order to calculate the illumination distribution, the grating parameter, $\Lambda$, is first calculated according to the relationship $$\Lambda = \lambda/(n_{\textit{eff}} - \sin \alpha)) \quad (7)$$

Once the grating parameter is known, the required illumination for the $p^{th}$ plasma inducted modulator, $I_P$, can be calculated according to the relationship $$I_P = (1 - \sin((2\pi dP)/\Lambda))/2 \quad (8)$$

where d is the spacing between ribs and P is the rank number of the arm of interest.

Figure 34A:
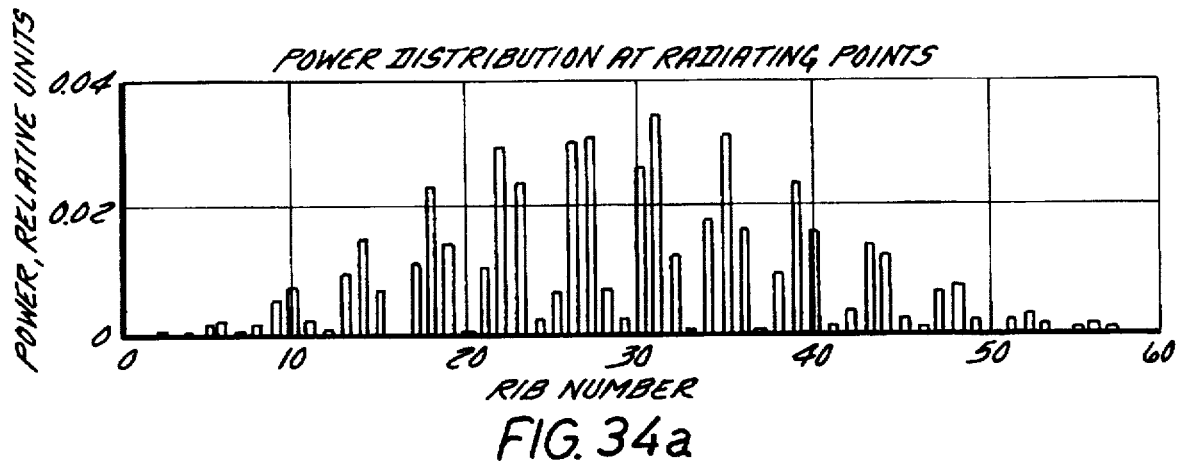
FIG. 34A illustrates relative radiated power as a function of rib number for the test panel steered to $\alpha=0°$ in accordance with the illumination function shown in FIG. 27.

Referring to FIG. 34A, the power distribution at the radiating points, from the illumination distribution depicted in FIG. 27, is shown. The radiating power for the $P^{th}$ arm, $Rad_P$, varies according to the relationship $$Rad_P = \left[ \prod_{\xi=0}^{P-1} (1 - K_\xi) \right] K_P \frac{1 + \sin\left(\frac{2\pi dP}{\Lambda}\right)}{2} \quad (9)$$

It will be appreciated that the function shown in FIG. 34A is a quasi-sinusoidal function resulting from imposing the function shown in FIG. 27 on the function shown in FIG. 25.

Figure 34B:
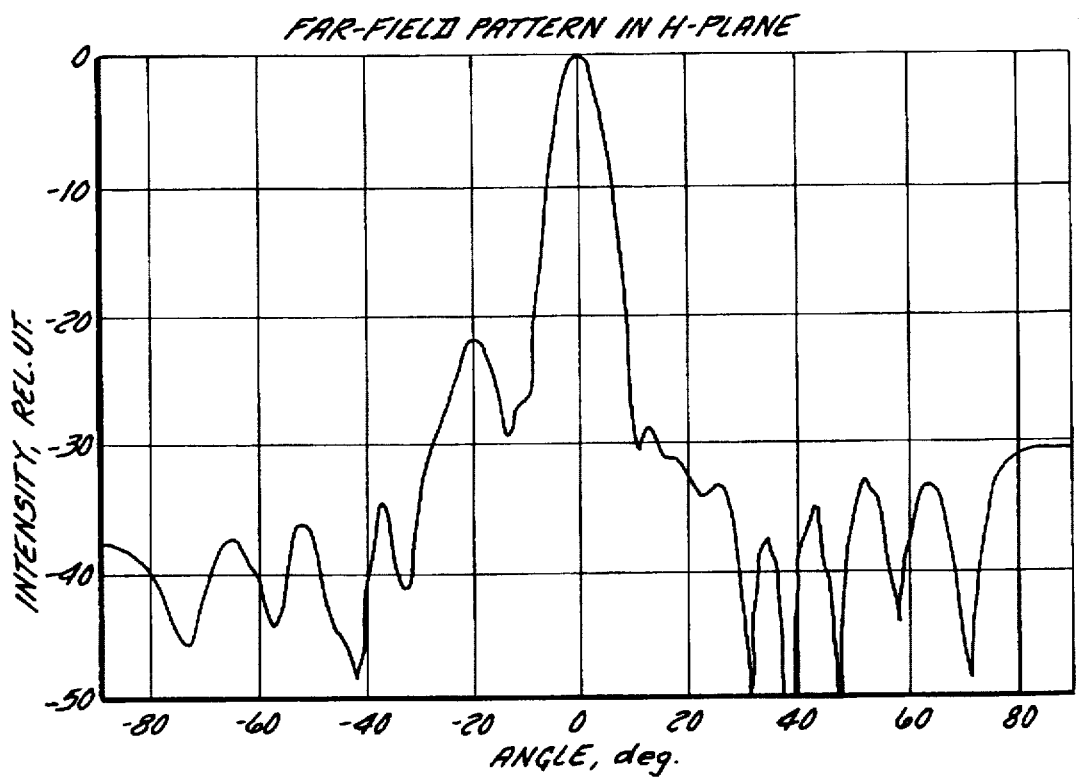
FIG. 34B illustrates far-field intensity as a function of angle for the power function depicted in FIG. 34A.
Figure 35A:
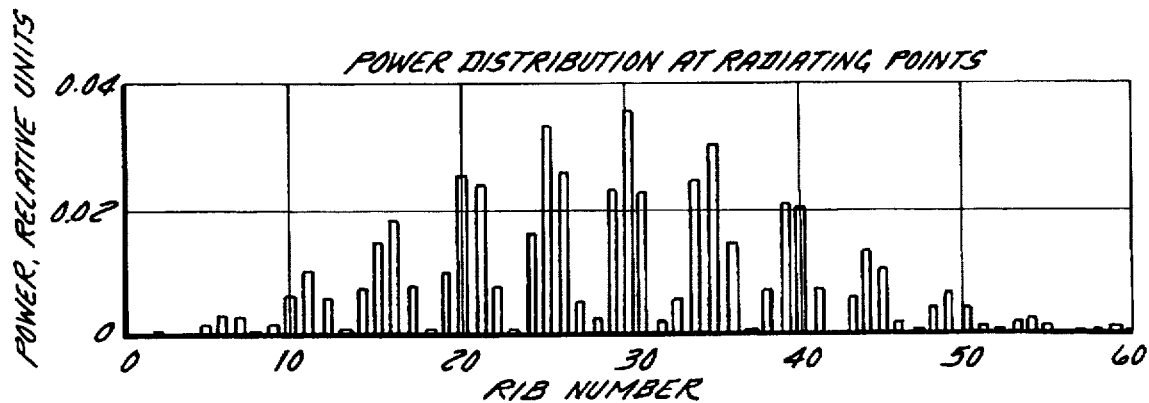
FIG. 35A illustrates relative radiated power as a function of rib number for the test panel steered to $\alpha=10°$ according to the present invention.
Figure 35B:
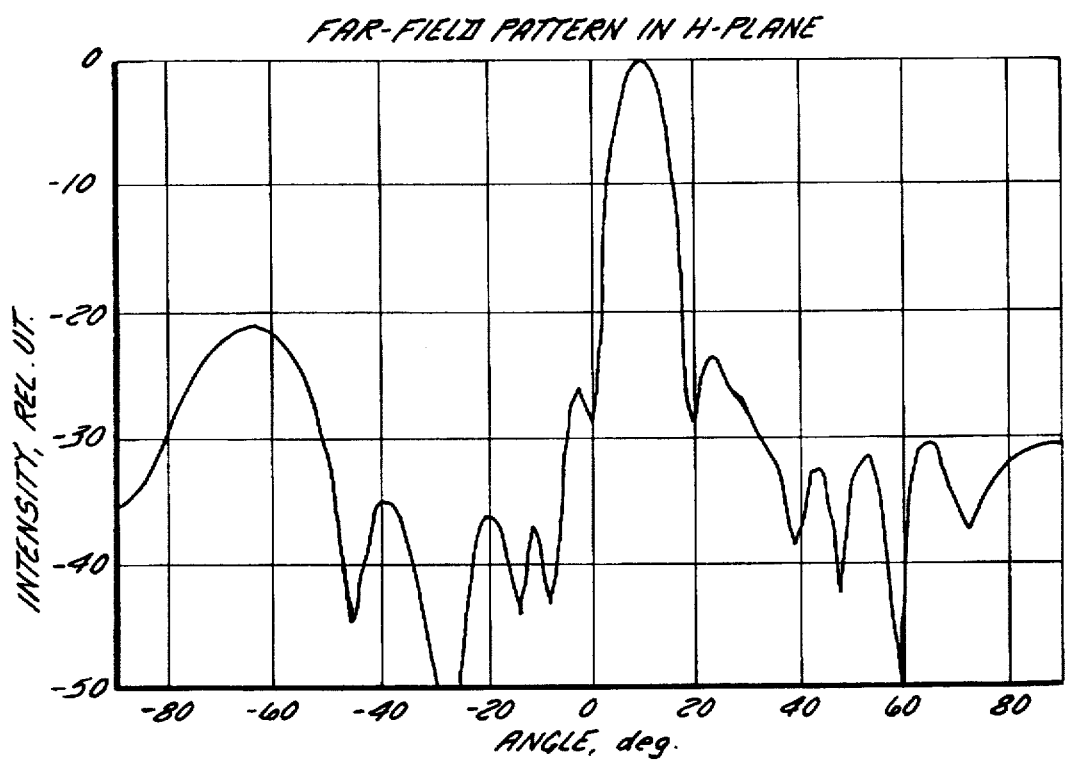
FIG. 35B illustrates far-field intensity as a function of angle for the power function depicted in FIG. 35A.
Figure 36A:
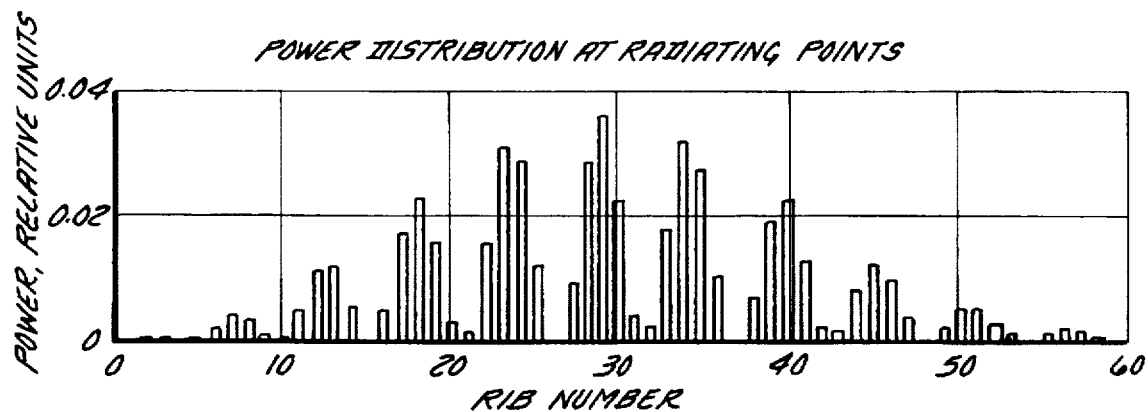
FIG. 36A illustrates relative radiated power as a function of rib number for the test panel steered to $\alpha=20°$ according to the present invention.
Figure 36B:
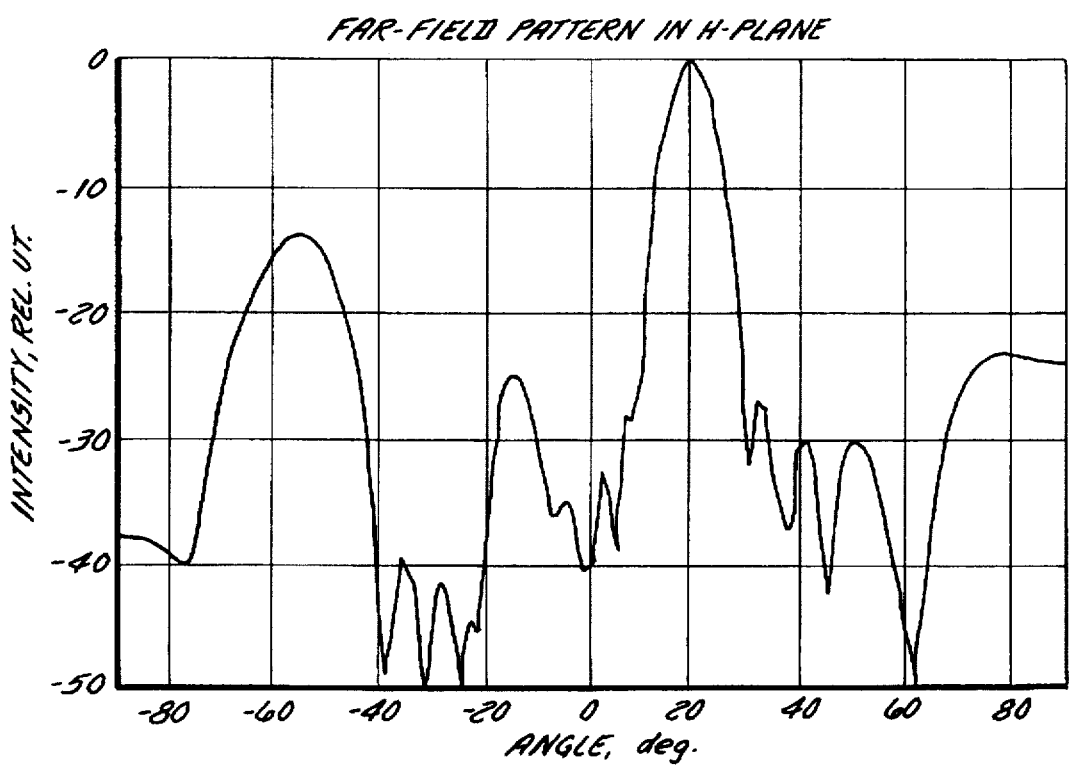
FIG. 36B illustrates far-field intensity as a function of angle for the power function depicted in FIG. 36A.
Figure 37A:
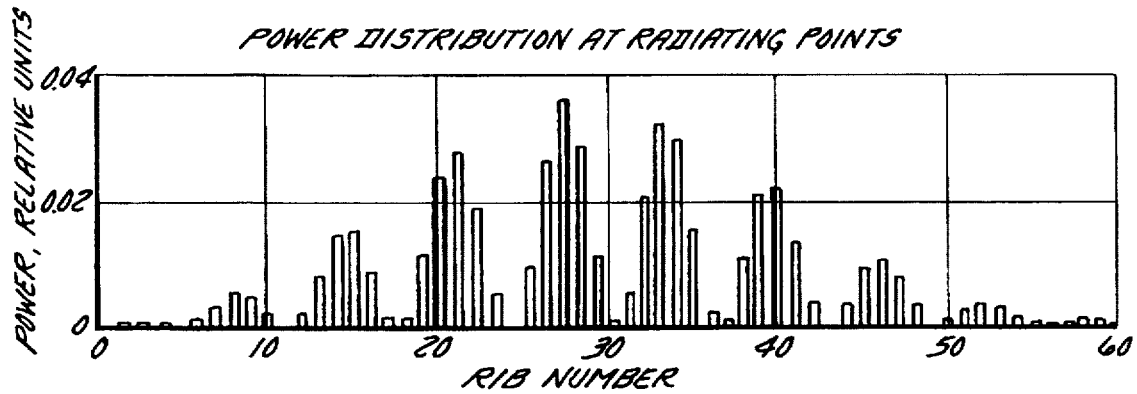
FIG. 37A illustrates relative radiated power as a function of rib number for the test panel steered to $\alpha=30°$ according to the present invention.
Figure 37B:
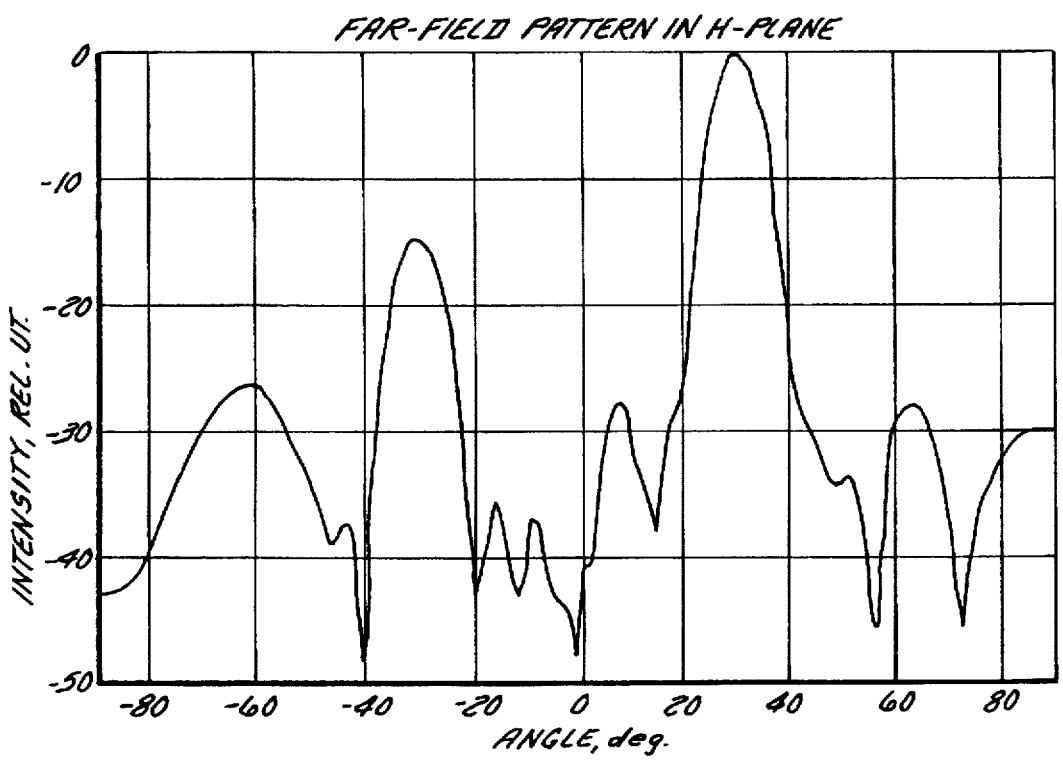
FIG. 37B illustrates far-field intensity as a function of angle for the power function depicted in FIG. 37A.
Figure 38A:
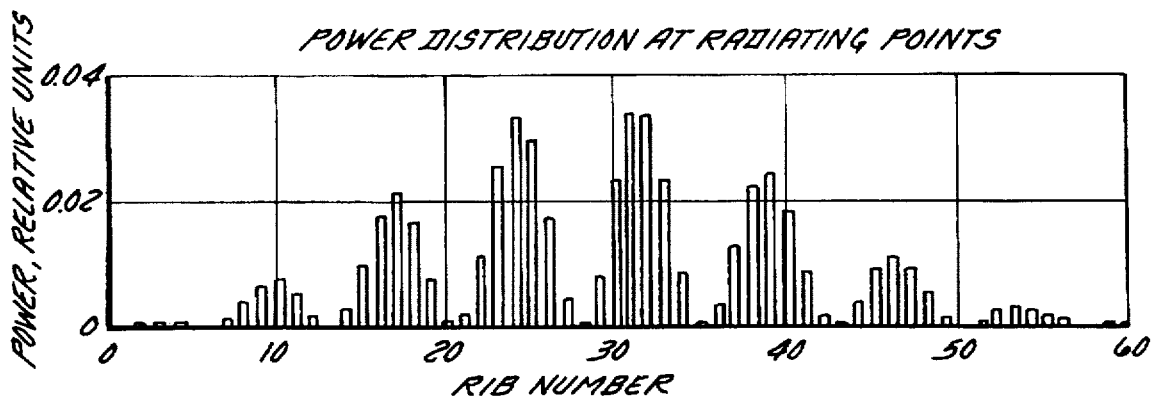
FIG. 38A illustrates relative radiated power as a function of rib number for the test panel steered to $\alpha=40°$ according to the present invention.
Figure 38B:
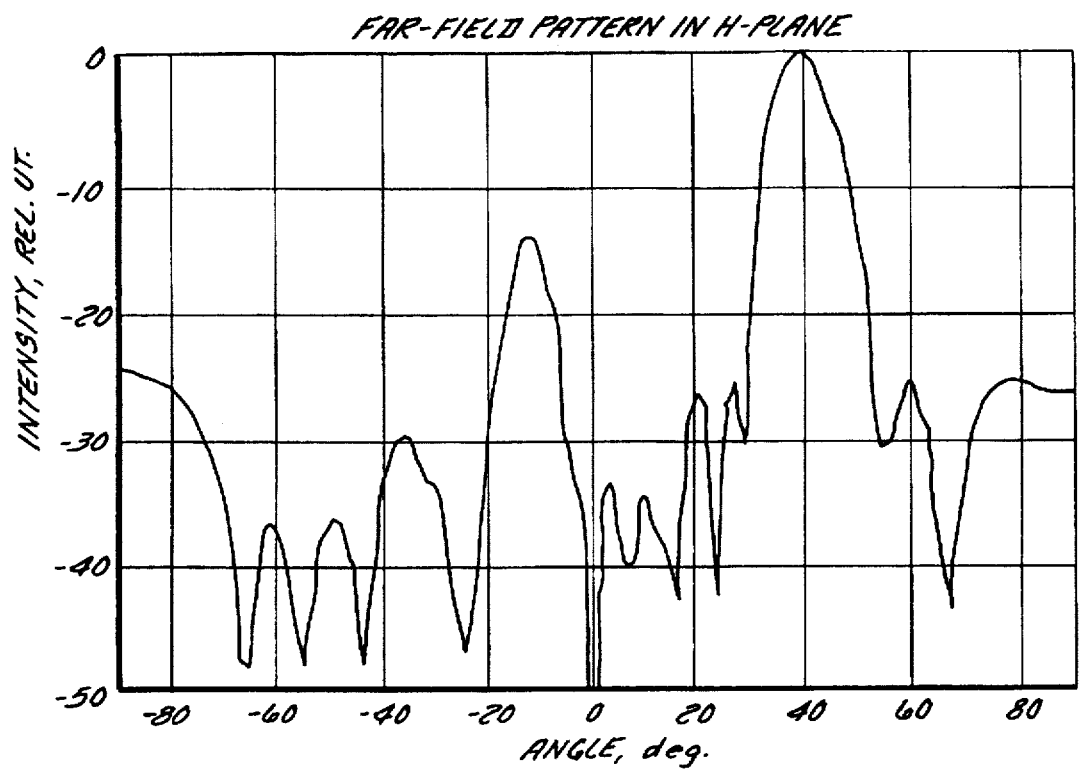
FIG. 38B illustrates far-field intensity as a function of angle for the power function depicted in FIG. 38A.
Figure 39A:
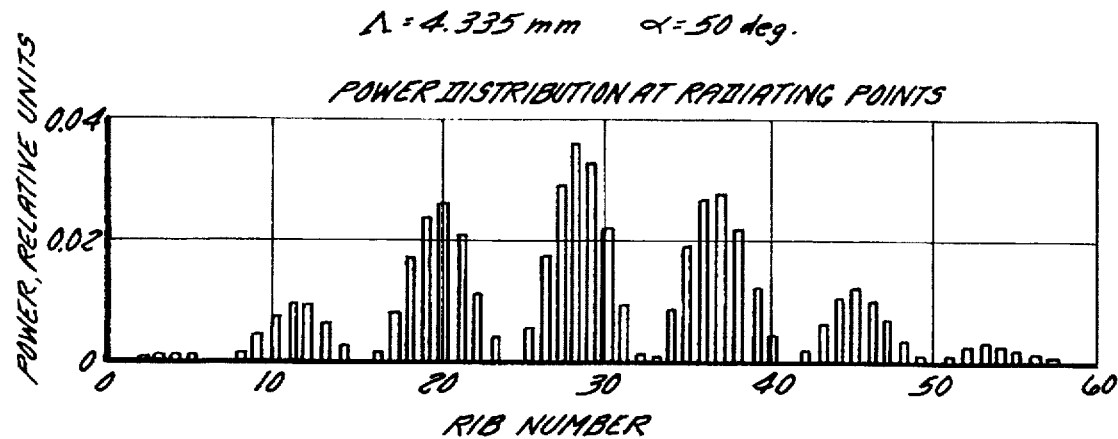
FIG. 39A illustrates relative radiated power as a function of rib number for the test panel steered to $\alpha=50°$ according to the present invention.
Figure 39B:
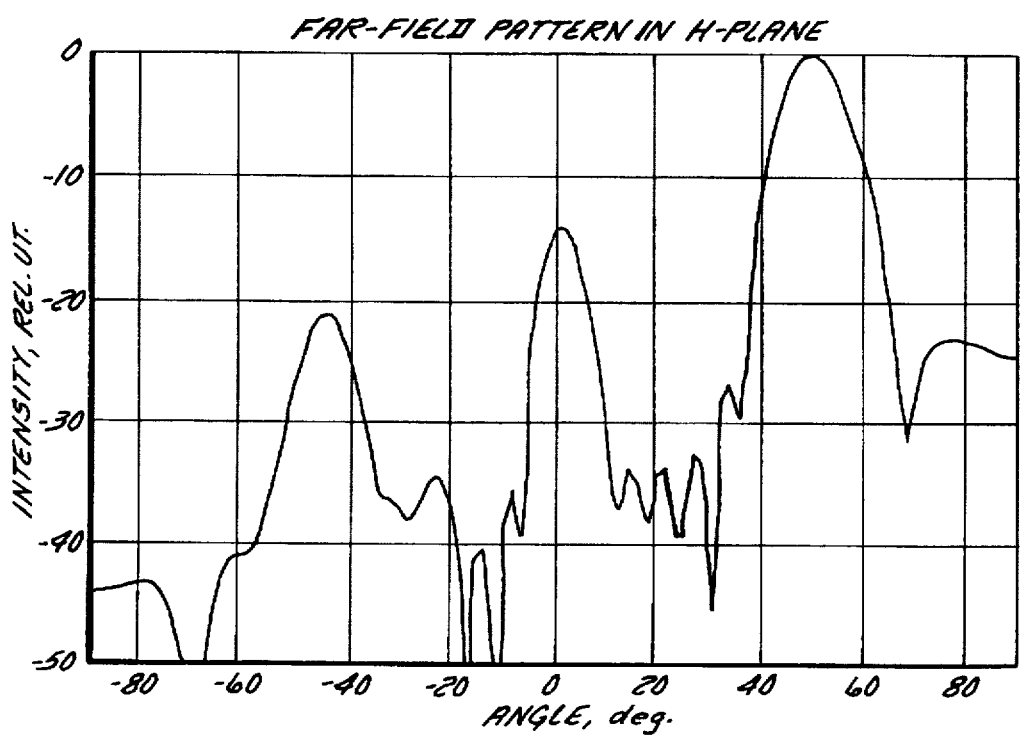
FIG. 39B illustrates far-field intensity as a function of angle for the power function depicted in FIG. 39A.
Figure 40A:
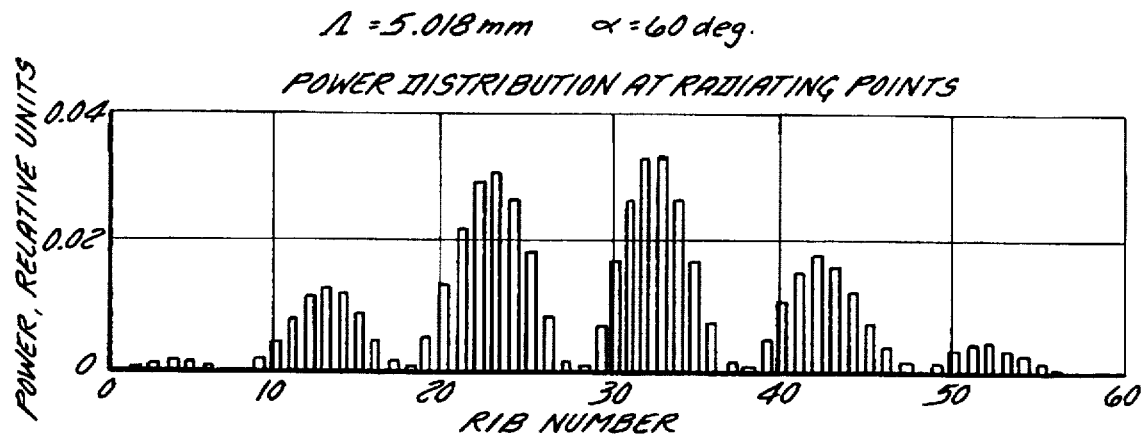
FIG. 40A illustrates relative radiated power as a function of rib number for the test panel steered to α=60° according to the present invention.
Figure 40B:
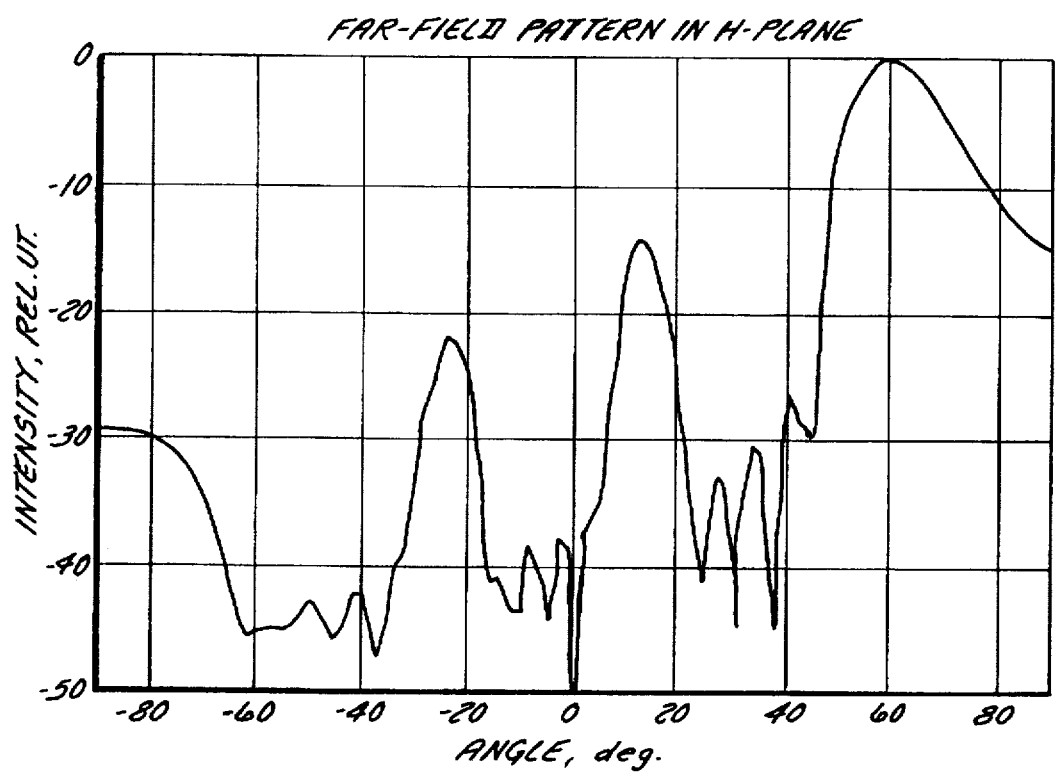
FIG. 40B illustrates far-field intensity as a function of angle for the power function depicted in FIG. 40A.

Referring to FIG. 34B, the far-field pattern in the H-plane from the power distribution illustrated in FIG. 34A is shown. The intensity in direction $\alpha$, $I(\alpha)$, varies according to the relationship $$I(\alpha) = \left| \left| \left[ \sum_{P=0}^{B} (\exp(i\phi_{P,\alpha}) \sqrt{Rad_P}) \right] \right| \right|^2 \quad (10)$$

where $$\phi_{P,\alpha} = \frac{2\pi x_P}{\lambda} (\sin(-\alpha) + n_{\textit{eff}}) \quad (11)$$

It will be appreciated that FIG. 34B shows a well defined beam pattern.

EXAMPLES

Specific embodiments of the present invention will now be further described by the following, nonlimiting examples which will serve to illustrate various features of significance. The examples are intended merely to facilitate an understanding of ways in which the present invention may be practiced and to further enable those of skill in the art to practice the present invention. Accordingly, the examples should not be construed as limiting the scope of the present invention.

Example 1

Assuming that the antenna radiates a beam with beamwidth of 1.5×8 degrees, an output aperture of 40×7.5 inches would be required. To have sidelobes at less than −20 dB, the spacing between the ribs should be less than 0.08 in. The spacing between the integrated panels should be approximately 0.2 in.

The size of each integrated panel could be approximately 4 in×1 in×0.2 in. Assuming the material fill factor is 60% and the silicon density is 2.328 g/cm$^3$, the weight of an individual integrated panel would be 18.3 grams. For an antenna with an output aperture of 40 in×7.5 inches, 380 elementary blocks might be required. Thus, the silicon portion of the radiating aperture weighs only 7 kg. However, the weight of the fiber bundle and the microwave feeder system must also be considered. A fiber bundle containing more than 18,000 fibers, which is 10 feet long, could weigh approximately 1.14 kg. Thus, the heaviest component is the microwave metal waveguide feeder system. It could weigh approximately 40 kg. Assuming that the metal frame carrying the 48 kg antenna parts weighs 20 kg, then the whole antenna will weigh less than 60 kg which is dramatically less than a typical phased array of the same aperture.

Such an antenna would require 18,800 LEDs. The corresponding required electrical peak power to control the beam is 2.7 kW. However, in view of the fact that the typical duty cycle for a fire control radar is less than 1%, such an antenna will consume electrical power of not more than 27 W. This is comparable to the switching power consumed by a single ferrite phase shifter of a typical phased array. And the number of phase shifters in a conventional phased array can be easily be as high as 10,000.

As illustrated in Table 1 (set forth below), the maximum average microwave power that an antenna according to the present invention can radiate can be estimated based on materials properties, packaging constraints and a given array configuration of M integrated panels. Alternatively, the antenna parameters can be tailored to meet a specification requiring the ability to radiate a certain average power.

TABLE 1

| Parameters used for the computation of the maximum radiating power. | |
|---|---|
| Heat resistance for silicon/air heat transfer: | $\Theta = 8.387 \ (10)^{-3} \ K \ watt^{-1} \ inch^{-2}$ |
| Rib height: | h = 0.1" |
| Rib length: | l = 1" |
| Rib spacing: | s = 0.079" |
| Panel length: | L = 4" |
| Number of ribs per IP: | N = 50 |
| Total surface area: | S = 18 in$^2$ |
| Tolerated temperature increase: | $\Delta T = 10$ K |
| Average power limit per IP: | W = 66.2 W |
| Number of IPs: | M = 38 |
| Average power limit per antenna: | M.W = 2.517 (10)$^3$ W |

It has been assumed that the antenna has 3 dB losses in the silicon blocks. Further, the allowed temperature increase is assumed not to exceed 10 degrees Kelvin. It can be seen from Table 1 that the effect of the chosen parameters is to establish an estimated maximum average power at 2.5 kW. Further, the peak power, at a duty cycle of 1%, is 250 kW. Table 1 demonstrates substantially improved results that are unexpected. Specifically, a major advantage of the rib waveguide design of the radiating elements is their efficient cooling by ambient air.

Example 2

Referring to FIGS. 30A–42B, a series of particular power distribution among the plurality of arms that is required to steer an integrated panel according to the present invention to various specific angles is shown. The grating parameter Λ (i.e., the variable parameter), required to steer to a particular angle a can be calculated in accordance with Eq. (7). In this example, the length of the array L=30 mm, the number of arms B=60, the effective index of refraction n=1.5, the frequency of operation f=94.3 GHz, and the spacing of the arms d=0.5 mm.

A practical application of the present invention which has value within the technological arts is providing both military and commercial vehicles, such as automobile, aircraft and sea vessels, with sophisticated and affordable scanning antennas. Diverse requirements exist in areas such as video, voice, data, and fax links, global positioning system (GPS) operations, collision avoidance radar and emergency communications. Digital beamforming, adaptive control and the use of neural networks will lead to more flexible and cheaper sensors for military and commercial systems. Because most of these sensors will be implemented by and under computer control, the development of a low-cost digital beam-former becomes critical. Existing phased array technology is very expensive and therefore oftentimes not acceptable for mass market applications. The optically controlled antenna herein described is a digitally controlled beamformer built on principles quite different from those of a conventional phased array. The use of the present invention will result in dramatically reducing the cost as well as the weight of sophisticated antennas. Moreover, this new type of antenna is very compatible with existing highly developed digital image processing technology, a technology that can be used for the new antenna as the means of effective and inexpensive control. No other approach has so much inherently in common with digital image processing as the one proposed here. There are virtually innumerable uses for the present invention described herein, all of which need not be detailed here.

This invention addresses a key problem of modern radar systems, that of providing a lightweight, inexpensive, non-mechanically steerable antenna. As high resolution systems require larger and larger size antennas, the antenna's weight becomes an impediment, especially for airborne radar applications. Specifically, the need to combine thousands of phase shifting and controlling elements into an antenna array contributes significantly to the increase in the antenna weight, as well as fabrication costs. Therefore, eliminating the separate phase shifting and controlling elements through the use of the plasma induced modulators and the free space recombination disclosed herein provides a lightweight and inexpensive optically steered antenna.

The present invention described herein provides substantially improved results that are unexpected. Specifically, the present invention requires no active elements on the antenna. The beam steering control is provided via optical fiber and no additional photo-detectors are necessary. Thus, the whole antenna array is built only of dielectric and semiconductor materials, thereby bringing down the antenna's weight. This also has the unexpected advantageous result of reducing the resulting antenna's radar cross-section (i.e., increasing the antenna's "stealthiness"). Since the array contains no active components it operates in both transmit and receive modes without switching elements. In addition, the fact that the antenna is controlled by light via optical fiber gives the antenna high immunity to electromagnetic (EM) interference.

As noted above, the present invention is based on the use of low-cost dielectric/semiconductor materials and provides for modular attachment of multiple integrated panel subsystems leading to a repetitive macro-structure (i.e., an array of integrated panels). The antenna manufacturing cost, especially in quantity, is expected to be low compared to that of manually assembled phased array antennas because industrially mature etching and/or microstrip fabrication technology can be used. This makes the proposed antenna very attractive as a potential commercial product.

A primary goal of the present invention is to reduce the weight of radar antennas. In contradistinction to the evolutionary approach of incremental weight reduction for traditional phase shifting elements, the present invention represents a completely new solution based on integration of the radiating elements on a single substrate with collective control via fiber optics together with free space (i.e., far-field), recombination of phase separated components.

All the disclosed embodiments of the invention described herein can be realized and practiced using conventional materials, components and subcombinatorial procedures without undue experimentation. The entirety of everything cited above or below is hereby expressly incorporated by reference.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept. In addition, the individual components need not be fabricated from the disclosed materials, but could be fabricated from virtually any suitable materials.

Moreover, the individual components need not be formed in the disclosed shapes, or assembled in the disclosed configuration, but could be provided in virtually any shape, and assembled in virtually any configuration, which operate so as to provide free space recombination. Further, although the antenna described herein is a physically separate module, it will be manifest that the antenna may be integrated into the apparatus with which it is associated. Furthermore, all the disclosed features of each disclosed embodiment can be combined with, or substituted for, the disclosed features of every other disclosed embodiment except where such features are mutually exclusive.

It is intended that the appended claims cover all such additions, modifications and rearrangements. Expedient embodiments of the present invention are differentiated by the appended subclaims.

REFERENCES

1. Mark's Standard Handbook for Mechanical Engineers, 9th ed., McGraw Hill (Eugene A. Avallone et al. eds., 1987).
2. Radar Handbook, 2nd ed., McGraw Hill (Merrill I. Skolnik ed., 1990).
3. The Electrical Engineering Handbook, CRC Press (Richard C. Dorf et al. eds., 1993).
4. Van Nostrand's Scientific Encyclopedia, 8th ed., Van Nostrand Reinhold (Douglas M. Considine et al. eds., 1995).
5. Handbook of Optics, 2nd ed., Vols. I–II, McGraw Hill (Michael Bass et al. eds., 1995).

6. Bahaa E. A. Saleh & Malvin C. Teich, Fundamentals of Photonics, John Wiley & Sons (1991).

What is claimed is:

1. An apparatus, comprising:
   a base;
   a feeder waveguide connected to said base; and
   a waveguide array (i) connected to said base, and (ii) electromagnetically coupled to said feeder waveguide, said waveguide array including:
   a plurality of arms, each of said plurality of arms including:
      a plasma induced modulator having a transmission coefficient that is $\leq 1$, said plasma induced modulator including:
         a rib waveguide electromagnetically coupled to said feeder waveguide, said rib waveguide including a nonphotosensitive dielectric waveguide;
         a photosensitive semiconductive plasma injector connected to said nonphotosensitive dielectric waveguide, said photosensitive semiconductive plasma injector including a proximal tapered end and a distal tapered end;
         an optical fiber connected to said photosensitive semiconductive plasma injector with a connector that includes a layer of indium tin oxide; and
         an infrared light emitting diode connected to said optical fiber with a nonimaging coupler,
   wherein each of said plurality of arms has a phase shift of approximately $\Delta\phi = 2\pi d n_{\it eff}/\lambda$ relative to every other of said plurality of arms, where d is a distance between each of said plurality of arms, $n_{\it eff} = \beta/K_o$ is an effective index of refraction in said feeder waveguide, $\beta$ is a propagation constant in said feeder waveguide, $K_o = 2\pi/\lambda$ is a free space wavenumber, $\lambda$ is the wavelength of an electromagnetic signal, and $d \leq \lambda/3$ and
   wherein a coupling coefficient $K_P$ between each of said plurality of arms and said feeder waveguide varies according to a relationship $K_P = 0.3(P/B)^2$, where P is a rank number of an individual arm and B is a total number of said plurality of arms.

2. An apparatus, comprising:
   a feeder waveguide; and
   a waveguide array electromagnetically coupled to said feeder waveguide, said waveguide array including:
   a plurality of arms, each of said plurality of arms including:
      a plasma induced modulator having a transmission coefficient that is $\leq 1$, said plasma induced modulator including:
         a rib waveguide electromagnetically coupled to said feeder waveguide.

3. The apparatus of claim 2, wherein a feeder waveguide propagation constant, $\beta$, for an electromagnetic signal, $\lambda$, varies according to a relationship $\beta > K_o$, where $K_o = 2\pi/\lambda$.

4. The apparatus of claim 2, wherein (i) said rib waveguide includes a first dielectric waveguide, and (ii) said plasma induced modulator includes:
   a photosensitive semiconductive plasma injector connected to said first dielectric waveguide; and
   an optical fiber connected to said photosensitive semiconductive plasma injector.

5. The apparatus of claim 4, wherein said optical fiber is connected to said photosensitive semiconductive plasma injector with a connector that includes a layer of indium tin oxide and said photosensitive semiconductive plasma injector includes a proximal tapered end and a distal tapered end.

6. The apparatus of claim 5, further comprising an infrared light emitting diode connected to said optical fiber with a nonimaging coupler.

7. The apparatus of claim 2, wherein a coupling coefficient between each of said plurality of arms and said feeder waveguide varies according to a relationship $K_P = 0.3(P/B)^2$, where P is a rank number of an individual arm and B is the total number of said plurality of arms.

8. The apparatus of claim 2, wherein said rib waveguide includes a tapered distal end.

9. The apparatus of claim 2, further comprising a base connected to said feeder waveguide and said plurality of arms.

10. A method of making the apparatus of claim 2, comprising:
    providing a prism; and
    etching said prism so as to form said feeder waveguide and said rib waveguide.

11. A system, comprising at least two of the apparatus of claim 2.

12. The system of claim 11, further comprising a microwave delivery system connected to said feeder waveguide and a fiber-optics delivery system connected to said plasma induced modulator.

13. A method, comprising utilizing the apparatus of claim 2.

14. In a vehicle, the improvement comprising the apparatus of claim 2.

15. An apparatus, comprising:
    a semiconductor plate including a first opposing side and a second opposing side;
    a metal layer connected to said first opposing side;
    a main feeder strip connected to said second opposing side; and
    a plurality of metal strips (i) connected to said second opposing side, and (ii) electromagnetically coupled to said main feeder strip, said plurality of metal strips defining a plurality of arms within said semiconductor plate, wherein the each of the plurality of arms includes an optically controlled wave propagation modulator.

16. The apparatus of claim 15, wherein each of said plurality of arms is separated by a distance, d, that varies according to a relationship $d \leq \lambda/3$, where $\lambda$ is the wavelength of an electromagnetic signal.

17. The apparatus of claim 15, wherein each of said plurality of metal strips includes a radiating patch.

18. The apparatus of claim 15, wherein each of said plurality of metal strips included a tapered distal end.

19. The apparatus of claim 15, wherein each of the optically controlled wave propagation modulators comprise a plurality of photo emitting diodes, each of said plurality of photo emitting diodes being optically connected to one of said plurality of arms with a non-imaging coupler.

20. The apparatus of claim 15, wherein said semiconductor plate includes a wedge distal end.

21. The apparatus of claim 15, wherein said semiconductor plate includes a transformer having a dimension of $\lambda/(4n)$, where $\lambda$ is a wavelength of an electromagnetic signal and n is a refractive index of said semiconductor plate.

22. A method of making an apparatus, comprising:
    providing a semiconductor plate, the semiconductor plate including a first opposing side and a second opposing side;
    depositing a metal layer on said first opposing side, said metal layer thereby being connected to said opposing side;

depositing a device metal layer on said second opposing side; and etching said device layer so as to form a main feed strip and a plurality of metal strips, the plurality of metal strips (i) connected to said second opposing side, and (ii) electromagnetically coupled to said main feeder strip said plurality of metal strips defining a plurality of arms within said semiconductor plate.

23. A system, comprising at least two of the apparatus of claim 15.

24. A method, comprising utilizing the apparatus of claim 15.

25. In a vehicle, the improvement comprising the apparatus of claim 15.

26. A method, comprising:
providing an integrated panel with a plurality of arms, wherein each of said plurality of arms has a phase shift of approximately $\Delta\phi = 2\pi d n_{eff}/\lambda$ relative to every other of said plurality of arms, where d is a distance between each of said plurality of arms, $n_{eff} = \beta/K_o$ is an effective index of refraction in said feeder waveguide, $\beta$ is a propagation constant in said feeder waveguide, $K_o = 2\pi/\lambda$ is a free space wavenumber, $\lambda$ is a wavelength of an electromagnetic signal and $d \leq \lambda/3$; and illuminating each of said plurality of arms with a flux $I_P$ according to a relationship $$I_P = (1 - \sin((2\pi dP)/\Lambda))/2$$

where P is a rank number of each of said plurality of arms and $\Lambda$ is a grating parameter.

27. The method of claim 26, wherein $$\Lambda = \lambda/(n_{eff} - \sin(\alpha))$$

where $n_{eff}$ is an effective refractive index of said electromagnetic signal in said plurality of arms and $\alpha$ is a beam steering angle.

28. The apparatus of claim 15, wherein each of the optically controlled wave propagation modulators comprises a plasma induced modulator.

29. The apparatus of claim 15, wherein the plasma induced modulator is coupled to a photosensitive semiconductor plasma injector.

30. The apparatus of claim 19, wherein the photo emitting diodes comprise one of the group consisting of: infrared light emitting diodes and semiconductor laser diodes.

* * * * *